US011723021B2

(12) United States Patent
Sridharan et al.

(10) Patent No.: US 11,723,021 B2
(45) Date of Patent: Aug. 8, 2023

(54) TECHNIQUES FOR DEMODULATION REFERENCE SIGNAL BUNDLING FOR CONFIGURED UPLINK CHANNELS

(71) Applicant: QUALCOMM Incorporated, San Diego, CA (US)

(72) Inventors: Gokul Sridharan, Sunnyvale, CA (US); Hung Dinh Ly, San Diego, CA (US); Peter Gaal, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 161 days.

(21) Appl. No.: 17/383,098

(22) Filed: Jul. 22, 2021

(65) Prior Publication Data
US 2023/0024493 A1    Jan. 26, 2023

(51) Int. Cl.
*H04W 72/04* (2023.01)
*H04W 72/12* (2023.01)
*H04L 5/00* (2006.01)
*H04W 72/1268* (2023.01)
*H04W 72/23* (2023.01)
*H04W 72/0446* (2023.01)

(52) U.S. Cl.
CPC ....... *H04W 72/1268* (2013.01); *H04L 5/0051* (2013.01); *H04W 72/0446* (2013.01); *H04W 72/23* (2023.01)

(58) Field of Classification Search
None
See application file for complete search history.

(56) References Cited

U.S. PATENT DOCUMENTS 10,045,334 B2 *   8/2018  Xu .......................... H04W 4/70
10,461,908 B2 *  10/2019  Patel ..................... H04L 5/0044
(Continued)

FOREIGN PATENT DOCUMENTS

WO    WO-2020253517 A1    12/2020

OTHER PUBLICATIONS

Abu-Ali N., et al., "Uplink Scheduling in LTE and LTE-Advanced: Tutorial, Survey and Evaluation Framework", IEEE Communications Surveys & Tutorials, IEEE, USA, vol. 16, No. 3, Jul. 1, 2014, pp. 1239-1265, XP011557066, sections III, III.A, IV.B, V.A, VI.E, VII. A, VII. C.

(Continued)

*Primary Examiner* — Sai Aung
(74) *Attorney, Agent, or Firm* — Holland & Hart LLP

(57) ABSTRACT

Methods, systems, and devices for wireless communications are described. Generally, a user equipment (UE) may be configured to transmit two or more consecutive transmissions that may be used for demodulation reference signal (DMRS) bundling. If criteria for DMRS bundling are not satisfied, the UE may generate dummy data to transmit during the skipped configured grant occasion, and may maintain phase continuity across the skipped configured grant occasion and any other PUSCHs in a set of uplink transmissions. In some examples, the UE may deprioritize DMRS bundling for sets of PUSCHs during which a PUSCH is to be skipped. If criteria for DMRS bundling are not satisfied, the UE may not maintain phase continuity across the set of PUSCHs, and may refrain from transmitting any data during the CG-PUSCH occasion.

30 Claims, 18 Drawing Sheets

(56) References Cited

U.S. PATENT DOCUMENTS

| | | | |
|---|---|---|---|
| 2014/0198664 A1 | 7/2014 | Chen et al. | |
| 2016/0095137 A1* | 3/2016 | Chen | H04W 72/23 370/329 |
| 2018/0098349 A1 | 4/2018 | Sun et al. | |
| 2019/0230656 A1 | 7/2019 | Soriaga et al. | |
| 2019/0261324 A1* | 8/2019 | Nam | H04L 5/0007 |
| 2020/0281009 A1* | 9/2020 | Lee | H04L 27/2607 |
| 2020/0374918 A1* | 11/2020 | Ang | H04W 72/23 |
| 2021/0167828 A1* | 6/2021 | Shao | H04W 72/23 |
| 2021/0243779 A1* | 8/2021 | Takeda | H04W 72/23 |
| 2021/0367727 A1* | 11/2021 | Go | H04L 5/0048 |
| 2022/0210816 A1* | 6/2022 | Wu | H04W 72/1273 |
| 2023/0049037 A1* | 2/2023 | Huang | H04B 7/0626 |

OTHER PUBLICATIONS

Partial International Search Report—PCT/US2022/036561—ISA/EPO—dated Nov. 30, 2022.

Apple Inc: "PUCCH Coverage Enhancements", 3GPP TSG RAN WG1 #104-e, R1-2101398, 3rd Generation Partnership Project (3GPP), Mobile Competence Centre, 650, Route Des Lucioles, F-06921 Sophia-Antipolis Cedex, France, vol. RAN WG1, No. e-Meeting, Jan. 25, 2021-Feb. 5, 2021 Jan. 18, 2021, XP051971565, pp. 1-3, Paragraph [02.2], Sections 1, 2.1.

CMCC: "Discussion on UL Inter UE Tx Prioritization/Multiplexing", 3GPP TSG RAN WGI #98bis, R1-1910168, 3rd Generation Partnership Project, Mobile Competence Centre, 650, Route Des Lucioles, F-06921 Sophia-Antipolis Cedex, France, vol. RAN WG1, No. Chongqing, China, Oct. 14, 2019-Oct. 20, 2019, Oct. 1, 2019, 10 Pages, XP051808027, Figure 2, Sections 1, 2.2, 2.3, 3.

Ericsson: "Joint Channel Estimation for PUSCH", 3GPP Draft, 3GPP TSG-RAN WG1 Meeting #104-e, R1-2101522, 3rd Generation Partnership Project (3GPP), Mobile Competence Centre, 650, Route Des Lucioles, F-06921 Sophia-Antipolis Cedex, France, vol. RAN WG1, No. E-Meeting, Jan. 25, 2021-Feb. 5, 2021 Jan. 19, 2021 (Jan. 19, 2021), XP051971683, 7 Pages, Sections 1 to 3.

Huawei, et al., "Discussion on Joint Channel Estimation for PUSCH", 3GPP TSG RAN WG1 Meeting #104bis-e, R1-2102313, 3rd Generation Partnership Project, Mobile Competence Centre, 650, Route Des Lucioles, F-06921 Sophia-Antipolis Cedex, France, vol. RAN WG1, No. E-meeting, Apr. 12, 2021-Apr. 20, 2021, Apr. 7, 2021, 8 Pages, XP052177033, Sections 1, 2.1.

Huawei, et al., "UL Inter-UE Transmission Prioritization and Multiplexing", 3GPP TSG RAN WG1 Meeting #97, R1-1906061, 3rd Generation Partnership Project, Mobile Competence Centre, 650, Route Des Lucioles, F-06921 Sophia-Antipolis Cedex, France, vol. RAN WG1, No. Reno, USA, May 13, 2019-May 17, 2019, May 13, 2019, 10 Pages, XP051727518, Sections 2-4, 6, 7.

International Search Report and Written Opinion—PCT/US2022/036561—ISA/EPO—dated Mar. 3, 2023.

Qualcomm Incorporated: "Joint Channel Estimation for PUSCH", 3GPP TSG-RAN WG1 Meeting #105e, R1-2104687, 3rd Generation Partnership Project, Mobile Competence Centre, 650, Route Des Lucioles, F-06921 Sophia-Antipolis Cedex, France, vol. RAN WG1, No. e-Meeting, May 10, 2021-May 27, 2021, May 12, 2021, XP052010938, 9 Pages, Figures 2, 6 sections 1, 2, 3.1, 3.2, 6, The whole document.

Vivo: "Discussion on Joint Channel Estimation for PUSCH", 3GPP TSG RAN WG1 #105-e, R1-2104378, 3rd Generation Partnership Project, Mobile Competence Centre, 650, Route Des Lucioles, F-06921 Sophia-Antipolis Cedex, France, vol. RAN WG1, No. e-Meeting, May 10, 2021-May 27, 2021, May 11, 2021, 12 Pages, XP052006129, Figures 8, 11 sections 1, 2.1, 4, 5.1, 6.

* cited by examiner

TECHNIQUES FOR DEMODULATION REFERENCE SIGNAL BUNDLING FOR CONFIGURED UPLINK CHANNELS

FIELD OF TECHNOLOGY

The following relates to wireless communications, including techniques for demodulation reference signal bundling for configured uplink channels.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support techniques for demodulation reference signal bundling for configured uplink channels. Generally, a user equipment (UE) may maintain phase continuity across different transmission opportunities to enable demodulation reference signal (DMRS) bundling. In some cases, a UE may skip physical uplink shared channel (PUSCH) transmission opportunities for configured grants. For example, the UE may be configured to transmit two or more consecutive transmissions (e.g., a set of two or more configured grant PUSCHs (CG-PUSCHs), or dynamic grant PUSCHs (DG-PUSCHs) and CG-PUSCHs), and may determine that one or more criteria for transmitting during the CG-PUSCH are not satisfied (e.g., may determine that the UE does not have enough buffered data to transmit during one of the CG-PUSCH occasions). In some examples, the UE may generate dummy data (e.g., filler data) for a packet data unit (PDU) to transmit during the skipped CG-PUSCH occasion, and may maintain phase continuity across the skipped CG-PUSCH occasion and any other PUSCHs in the set (e.g., during a DMRS bundling interval).

In some examples, the UE may deprioritize DMRS bundling for sets of PUSCHs during which a PUSCH is to be skipped (e.g., despite DMRS bundling being enabled). For example, in a set of PUSCHs, if a CG-PUSCH occasion is adjacent to one or more scheduled PUSCHs (e.g., another CG-PUSCH occasion, a DG-PUSCH, etc.), then if one or more conditions are satisfied, the UE may support DMRS bundling for the set of PUSCHs. However, if one or more criteria are not satisfied (e.g., the UE may determine that the UE does not have enough buffered data to transmit during one of the CG-PUSCH occasions), then the UE may not maintain phase continuity across the set of PUSCHs, and may refrain from transmitting any data during the CG-PUSCH occasion.

A method for wireless communications at a user equipment (UE) is described. The method may include receiving, from a base station, control signaling including a configured grant scheduling a first uplink channel during a first time slot, the first time slot different from a second time slot scheduled for transmission of a second uplink channel, generating dummy data for the first uplink channel based on information associated with the configured grant failing to satisfy a transmission criterion, and transmitting, to the base station, the dummy data and a first set of multiple demodulation reference signals in the first uplink channel during the first time slot and a second set of multiple demodulation reference signals in the second uplink channel during the second time slot, the first set of multiple demodulation reference signals and the second set of multiple demodulation reference signals having phase continuity.

An apparatus for wireless communications at a UE is described. The apparatus may include a processor, memory coupled with the processor, and instructions stored in the memory. The instructions may be executable by the processor to cause the apparatus to receive, from a base station, control signaling including a configured grant scheduling a first uplink channel during a first time slot, the first time slot different from a second time slot scheduled for transmission of a second uplink channel, generate dummy data for the first uplink channel based on information associated with the configured grant failing to satisfy a transmission criterion, and transmit, to the base station, the dummy data and a first set of multiple demodulation reference signals in the first uplink channel during the first time slot and a second set of multiple demodulation reference signals in the second uplink channel during the second time slot, the first set of multiple demodulation reference signals and the second set of multiple demodulation reference signals having phase continuity.

Another apparatus for wireless communications at a UE is described. The apparatus may include means for receiving, from a base station, control signaling including a configured grant scheduling a first uplink channel during a first time slot, the first time slot different from a second time slot scheduled for transmission of a second uplink channel, means for generating dummy data for the first uplink channel based on information associated with the configured grant failing to satisfy a transmission criterion, and means for transmitting, to the base station, the dummy data and a first set of multiple demodulation reference signals in the first uplink channel during the first time slot and a second set of multiple demodulation reference signals in the second uplink channel during the second time slot, the first set of multiple demodulation reference signals and the second set of multiple demodulation reference signals having phase continuity.

A non-transitory computer-readable medium storing code for wireless communications at a UE is described. The code may include instructions executable by a processor to receive, from a base station, control signaling including a configured grant scheduling a first uplink channel during a first time slot, the first time slot different from a second time slot scheduled for transmission of a second uplink channel, generate dummy data for the first uplink channel based on information associated with the configured grant failing to satisfy a transmission criterion, and transmit, to the base station, the dummy data and a first set of multiple demodulation reference signals in the first uplink channel during the first time slot and a second set of multiple demodulation reference signals in the second uplink channel during the second time slot, the first set of multiple demodulation reference signals and the second set of multiple demodulation reference signals having phase continuity.

Some examples of the method, apparatuses, and non-transitory computer-readable medium described herein may further include operations, features, means, or instructions for receiving, from the base station, control signaling instructing the UE to maintain the phase continuity across a set of multiple uplink channels including the first uplink channel and the second uplink channel.

Some examples of the method, apparatuses, and non-transitory computer-readable medium described herein may further include operations, features, means, or instructions for generating the dummy data for the first uplink channel may be based on receiving the control signaling instructing the UE to maintain the phase continuity across the set of multiple uplink channels.

Some examples of the method, apparatuses, and non-transitory computer-readable medium described herein may further include operations, features, means, or instructions for receiving, from the base station, a downlink control information message including a dynamic grant scheduling the second uplink channel during the second time slot, where transmitting the second set of multiple demodulation reference signals in the second uplink channel may be based on receiving the dynamic grant.

Some examples of the method, apparatuses, and non-transitory computer-readable medium described herein may further include operations, features, means, or instructions for receiving, from the base station, control signaling including a second configured grant scheduling the second uplink channel during the second time slot, where transmitting the second set of multiple demodulation reference signals in the second uplink channel may be based on receiving the second configured grant.

In some examples of the method, apparatuses, and non-transitory computer-readable medium described herein, the first configured grant includes a first instance of a first set of configured grant resources and the second configured grant includes a second instance of the first set of configured grant resources and the first configured grant includes an instance of a first set of configured grant resources and the second configured grant includes an instance of a second set of configured grant resources.

Some examples of the method, apparatuses, and non-transitory computer-readable medium described herein may further include operations, features, means, or instructions for determining that a quantity of data in a buffer for transmission to the base station fails to satisfy a threshold, where the configured grant failing to satisfy the transmission criterion and transmitting the dummy data may be based on the determining.

In some examples of the method, apparatuses, and non-transitory computer-readable medium described herein, one or more of parameters used to maintain the phase continuity includes a phase value of the first uplink channel and the second uplink channel, a radio frequency band used by the first uplink channel and the second uplink channel, a transmission power of the first uplink channel and the second uplink channel, one or more antenna ports used for transmitting the first set of multiple demodulation reference signals and the second set of multiple demodulation reference signals, a precoding scheme of the first uplink channel and the second uplink channel, or any combination thereof.

Some examples of the method, apparatuses, and non-transitory computer-readable medium described herein may further include operations, features, means, or instructions for maintaining the phase continuity across the first time slot and the second time slot using a demodulation reference signal bundling procedure that supports joint channel estimation at the base station, where the transmitting may be based on maintaining the phase continuity.

In some examples of the method, apparatuses, and non-transitory computer-readable medium described herein, the first uplink channel includes a physical uplink shared channel and the second uplink channel includes a physical uplink shared channel.

A method for wireless communications at a base station is described. The method may include transmitting, to a UE, control signaling including a configured grant scheduling a first uplink channel during a first time slot, the first time slot different from a second time slot scheduled for transmission of a second uplink channel, receiving, from the UE based on the configured grant, dummy data and a first set of multiple demodulation reference signals in the first uplink channel during the first time slot and a second set of multiple demodulation reference signals in the second uplink channel during the second time slot, the first set of multiple demodulation reference signals and the second set of multiple demodulation reference signals having phase continuity, performing channel estimation for at least the second uplink channel based on the first set of multiple demodulation reference signals and the second uplink channel having phase continuity, and decoding the second uplink channel based on the channel estimation.

An apparatus for wireless communications at a base station is described. The apparatus may include a processor, memory coupled with the processor, and instructions stored in the memory. The instructions may be executable by the processor to cause the apparatus to transmit, to a UE, control signaling including a configured grant scheduling a first uplink channel during a first time slot, the first time slot different from a second time slot scheduled for transmission of a second uplink channel, receive, from the UE based on the configured grant, dummy data and a first set of multiple demodulation reference signals in the first uplink channel during the first time slot and a second set of multiple demodulation reference signals in the second uplink channel during the second time slot, the first set of multiple demodulation reference signals and the second set of multiple demodulation reference signals having phase continuity, perform channel estimation for at least the second uplink channel based on the first set of multiple demodulation reference signals and the second uplink channel having phase continuity, and decode the second uplink channel based on the channel estimation.

Another apparatus for wireless communications at a base station is described. The apparatus may include means for transmitting, to a UE, control signaling including a configured grant scheduling a first uplink channel during a first time slot, the first time slot different from a second time slot scheduled for transmission of a second uplink channel, means for receiving, from the UE based on the configured grant, dummy data and a first set of multiple demodulation reference signals in the first uplink channel during the first time slot and a second set of multiple demodulation reference signals in the second uplink channel during the second time slot, the first set of multiple demodulation reference signals and the second set of multiple demodulation reference signals having phase continuity, means for performing channel estimation for at least the second uplink channel based on the first set of multiple demodulation reference signals and the second uplink channel having phase continuity, and means for decoding the second uplink channel based on the channel estimation.

A non-transitory computer-readable medium storing code for wireless communications at a base station is described. The code may include instructions executable by a processor to transmit, to a UE, control signaling including a configured grant scheduling a first uplink channel during a first time slot, the first time slot different from a second time slot scheduled for transmission of a second uplink channel, receive, from the UE based on the configured grant, dummy data and a first set of multiple demodulation reference signals in the first uplink channel during the first time slot and a second set of multiple demodulation reference signals in the second uplink channel during the second time slot, the first set of multiple demodulation reference signals and the second set of multiple demodulation reference signals having phase continuity, perform channel estimation for at least the second uplink channel based on the first set of multiple demodulation reference signals and the second uplink channel having phase continuity, and decode the second uplink channel based on the channel estimation.

Some examples of the method, apparatuses, and non-transitory computer-readable medium described herein may further include operations, features, means, or instructions for transmitting, to the UE, control signaling instructing the UE to maintain the phase continuity across a set of multiple uplink channels including the first uplink channel and the second uplink channel.

Some examples of the method, apparatuses, and non-transitory computer-readable medium described herein may further include operations, features, means, or instructions for receiving the dummy data in the first uplink channel may be based on transmitting the control signaling instructing the UE to maintain the phase continuity across the set of multiple uplink channels.

Some examples of the method, apparatuses, and non-transitory computer-readable medium described herein may further include operations, features, means, or instructions for transmitting, to the UE, a downlink control information message including a dynamic grant scheduling the second uplink channel during the second time slot, where receiving the second set of multiple demodulation reference signals in the second uplink channel may be based on transmitting the dynamic grant.

Some examples of the method, apparatuses, and non-transitory computer-readable medium described herein may further include operations, features, means, or instructions for transmitting, to the UE, control signaling including a second configured grant scheduling the second uplink channel during the second time slot, where receiving the second set of multiple demodulation reference signals in the second uplink channel may be based on transmitting the second configured grant.

Some examples of the method, apparatuses, and non-transitory computer-readable medium described herein may further include operations, features, means, or instructions for receiving the dummy data may be based on the configured grant failing to satisfy a transmission criterion for the UE.

In some examples of the method, apparatuses, and non-transitory computer-readable medium described herein, one or more parameters used to receive the first set of multiple demodulation reference signals and the second set of multiple demodulation reference signals having the phase continuity includes a phase value of the first uplink channel and the second uplink channel, a radio frequency band used by the first uplink channel and the second uplink channel, a resource block used by the first uplink channel and the second uplink channel, a transmission power of the first uplink channel and the second uplink channel, one or more antenna ports used for receiving the first set of multiple demodulation reference signals and the second set of multiple demodulation reference signals, a precoding scheme of the first uplink channel and the second uplink channel, or any combination thereof.

A method for wireless communications a UE is described. The method may include receiving, from a base station, control signaling instructing the UE to maintain phase continuity between a first set of multiple demodulation reference signals in a first uplink channel and a second set of multiple demodulation reference signals in a second uplink channel, receiving, from the base station, control signaling including a configured grant scheduling the first uplink channel during a first time slot, the first time slot different from a second time slot scheduled for transmission of the second uplink channel, suppressing a transmission of the first uplink channel during the first time slot based on information associated with the configured grant failing to satisfy a transmission criterion, and transmitting, to the base station, the second uplink channel and the second set of multiple demodulation reference signals associated with at least the second uplink channel, the second set of multiple demodulation reference signals of the second uplink channel failing to maintain the phase continuity with the first set of multiple demodulation reference signals based on the suppressing.

An apparatus for wireless communications a UE is described. The apparatus may include a processor, memory coupled with the processor, and instructions stored in the memory. The instructions may be executable by the processor to cause the apparatus to receive, from a base station, control signaling instructing the UE to maintain phase continuity between a first set of multiple demodulation reference signals in a first uplink channel and a second set of multiple demodulation reference signals in a second uplink channel, receive, from the base station, control signaling including a configured grant scheduling the first uplink channel during a first time slot, the first time slot different from a second time slot scheduled for transmission of the second uplink channel, suppress a transmission of the first uplink channel during the first time slot based on information associated with the configured grant failing to satisfy a transmission criterion, and transmit, to the base station, the second uplink channel and the second set of multiple demodulation reference signals associated with at least the second uplink channel, the second set of multiple demodulation reference signals of the second uplink channel failing to maintain the phase continuity with the first set of multiple demodulation reference signals based on the suppressing.

Another apparatus for wireless communications a UE is described. The apparatus may include means for receiving, from a base station, control signaling instructing the UE to maintain phase continuity between a first set of multiple demodulation reference signals in a first uplink channel and a second set of multiple demodulation reference signals in a second uplink channel, means for receiving, from the base station, control signaling including a configured grant scheduling the first uplink channel during a first time slot, the first time slot different from a second time slot scheduled for transmission of the second uplink channel, means for suppressing a transmission of the first uplink channel during the first time slot based on information associated with the configured grant failing to satisfy a transmission criterion, and means for transmitting, to the base station, the second uplink channel and the second set of multiple demodulation reference signals associated with at least the second uplink channel, the second set of multiple demodulation reference signals of the second uplink channel failing to maintain the phase continuity with the first set of multiple demodulation reference signals based on the suppressing.

A non-transitory computer-readable medium storing code for wireless communications a UE is described. The code may include instructions executable by a processor to receive, from a base station, control signaling instructing the UE to maintain phase continuity between a first set of multiple demodulation reference signals in a first uplink channel and a second set of multiple demodulation reference signals in a second uplink channel, receive, from the base station, control signaling including a configured grant scheduling the first uplink channel during a first time slot, the first time slot different from a second time slot scheduled for transmission of the second uplink channel, suppress a transmission of the first uplink channel during the first time slot based on information associated with the configured grant failing to satisfy a transmission criterion, and transmit, to the base station, the second uplink channel and the second set of multiple demodulation reference signals associated with at least the second uplink channel, the second set of multiple demodulation reference signals of the second uplink channel failing to maintain the phase continuity with the first set of multiple demodulation reference signals based on the suppressing.

Some examples of the method, apparatuses, and non-transitory computer-readable medium described herein may further include operations, features, means, or instructions for receiving, from the base station, a downlink control information message including a dynamic grant scheduling the second uplink channel during the second time slot, where transmitting the second set of multiple demodulation reference signals in the second uplink channel may be based on receiving the dynamic grant.

Some examples of the method, apparatuses, and non-transitory computer-readable medium described herein may further include operations, features, means, or instructions for receiving, from the base station, control signaling including a second configured grant scheduling the second uplink channel during the second time slot, where transmitting the second set of multiple demodulation reference signals in the second uplink channel may be based on receiving the configured grant.

In some examples of the method, apparatuses, and non-transitory computer-readable medium described herein, the first configured grant includes a first instance of a first set of configured grant resources and the second configured grant includes a second instance of the first set of configured grant resources and the first configured grant includes an instance of a first set of configured grant resources and the second configured grant includes an instance of a second set of configured grant resources.

Some examples of the method, apparatuses, and non-transitory computer-readable medium described herein may further include operations, features, means, or instructions for determining that a quantity of data in a buffer for transmission to the base station failing to satisfy a threshold, where the configured grant failing to satisfy the transmission criterion and transmitting the dummy data may be based on the determining.

Some examples of the method, apparatuses, and non-transitory computer-readable medium described herein may further include operations, features, means, or instructions for selecting, based on the suppressing, a first set of parameters for transmitting the first set of multiple demodulation reference signals and selecting, based on the suppressing, a second set of parameters for transmitting the second set of multiple demodulation reference signals, where the second set of parameters may be different from the first set of parameters.

In some examples of the method, apparatuses, and non-transitory computer-readable medium described herein, the first set of parameters includes a phase value of the first uplink channel, a radio frequency band used by the first uplink channel, a transmission power of the first uplink channel, one or more antenna ports used for transmitting the first set of multiple demodulation reference signals, a precoding scheme of the first uplink channel, or any combination thereof and the second set of parameters includes a phase value of the second uplink channel, a radio frequency band used by the second uplink channel, a transmission power of the second uplink channel, one or more antenna ports used for transmitting the second set of multiple demodulation reference signals, a precoding scheme of the second uplink channel, or any combination thereof.

In some examples of the method, apparatuses, and non-transitory computer-readable medium described herein, the first uplink channel includes a physical uplink shared channel or a physical uplink control channel and the second uplink channel includes a physical uplink shared channel or a physical uplink control channel.

A method for wireless communications at a base station is described. The method may include transmitting, to a UE, control signaling instructing the UE to maintain phase continuity between a first set of multiple demodulation reference signals in a first uplink channel and a second set of multiple demodulation reference signals in a second uplink channel, transmitting, to the UE, control signaling including a configured grant scheduling the first uplink channel during a first time slot, the first time slot different from a second time slot scheduled for transmission of the second uplink channel, monitor for the first uplink channel during the first time slot and the second uplink channel during the second time slot, and receive, from the UE based on the monitoring, the second uplink channel and the second set of multiple demodulation reference signals associated with at least the second uplink channel, the second set of multiple demodulation reference signals of the second uplink channel failing to maintain the phase continuity with the first set of multiple demodulation reference signals.

An apparatus for wireless communications at a base station is described. The apparatus may include a processor, memory coupled with the processor, and instructions stored in the memory. The instructions may be executable by the processor to cause the apparatus to transmit, to a UE, control signaling instructing the UE to maintain phase continuity between a first set of multiple demodulation reference signals in a first uplink channel and a second set of multiple demodulation reference signals in a second uplink channel, transmit, to the UE, control signaling including a configured grant scheduling the first uplink channel during a first time slot, the first time slot different from a second time slot scheduled for transmission of the second uplink channel, monitor for the first uplink channel during the first time slot and the second uplink channel during the second time slot, and receive, from the UE based on the monitoring, the second uplink channel and the second set of multiple demodulation reference signals associated with at least the second uplink channel, the second set of multiple demodulation reference signals of the second uplink channel failing to maintain the phase continuity with the first set of multiple demodulation reference signals.

Another apparatus for wireless communications at a base station is described. The apparatus may include means for transmitting, to a UE, control signaling instructing the UE to maintain phase continuity between a first set of multiple demodulation reference signals in a first uplink channel and a second set of multiple demodulation reference signals in a second uplink channel, means for transmitting, to the UE, control signaling including a configured grant scheduling the first uplink channel during a first time slot, the first time slot different from a second time slot scheduled for transmission of the second uplink channel, means for monitor for the first uplink channel during the first time slot and the second uplink channel during the second time slot, and means for receive, from the UE based on the monitoring, the second uplink channel and the second set of multiple demodulation reference signals associated with at least the second uplink channel, the second set of multiple demodulation reference signals of the second uplink channel failing to maintain the phase continuity with the first set of multiple demodulation reference signals.

A non-transitory computer-readable medium storing code for wireless communications at a base station is described. The code may include instructions executable by a processor to transmit, to a UE, control signaling instructing the UE to maintain phase continuity between a first set of multiple demodulation reference signals in a first uplink channel and a second set of multiple demodulation reference signals in a second uplink channel, transmit, to the UE, control signaling including a configured grant scheduling the first uplink channel during a first time slot, the first time slot different from a second time slot scheduled for transmission of the second uplink channel, monitor for the first uplink channel during the first time slot and the second uplink channel during the second time slot, and receive, from the UE based on the monitoring, the second uplink channel and the second set of multiple demodulation reference signals associated with at least the second uplink channel, the second set of multiple demodulation reference signals of the second uplink channel failing to maintain the phase continuity with the first set of multiple demodulation reference signals.

Some examples of the method, apparatuses, and non-transitory computer-readable medium described herein may further include operations, features, means, or instructions for transmitting, to the UE, a downlink control information message including a dynamic grant scheduling the second uplink channel during the second time slot, where receiving the second set of multiple demodulation reference signals in the second uplink channel may be based on transmitting the dynamic grant.

Some examples of the method, apparatuses, and non-transitory computer-readable medium described herein may further include operations, features, means, or instructions for transmitting, to the UE, control signaling including a second configured grant scheduling the second uplink channel during the second time slot, where receiving the second set of multiple demodulation reference signals in the second uplink channel may be based on transmitting the configured grant.

Some examples of the method, apparatuses, and non-transitory computer-readable medium described herein may further include operations, features, means, or instructions for refraining from performing a channel estimation for the first uplink channel and the second uplink channel based on failing to receive the first uplink channel and the second set of multiple demodulation reference signals failing to maintain the phase continuity with the first set of multiple demodulation reference signals.

Some examples of the method, apparatuses, and non-transitory computer-readable medium described herein may further include operations, features, means, or instructions for receiving the first set of multiple demodulation reference signals according to a first set of parameters based on the monitoring and the first set of multiple demodulation reference signals failing to maintain phase continuity with the first set of multiple demodulation reference signals and receiving the second set of multiple demodulation reference signals according to a second set of parameters based on the monitoring and the second set of multiple demodulation reference signals failing to maintain phase continuity with the first set of multiple demodulation reference signals.

DETAILED DESCRIPTION

Figure 1:
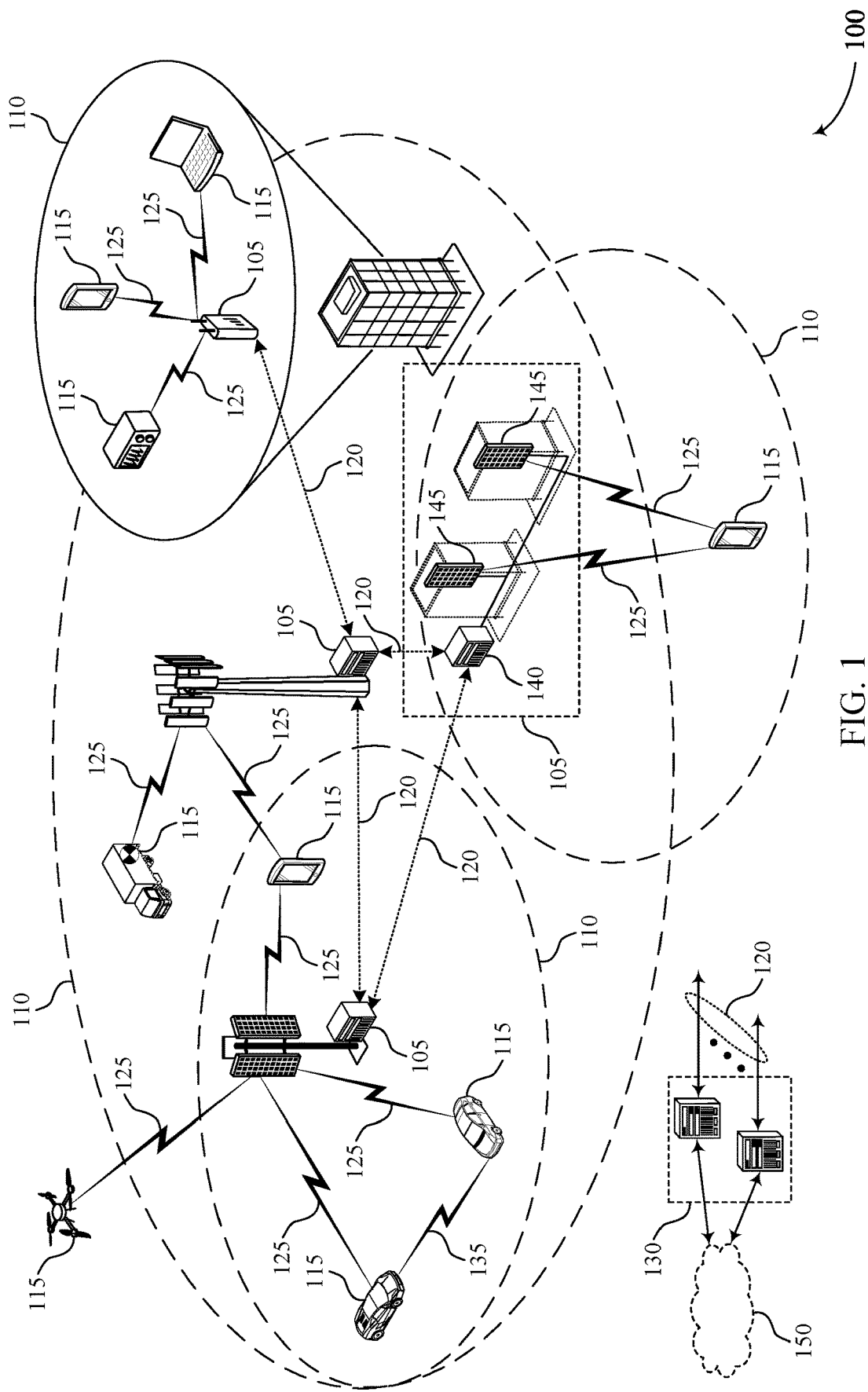
FIG. 1 illustrates an example of a wireless communications system that supports techniques for demodulation reference signal bundling for configured uplink channels in accordance with aspects of the present disclosure.

A wireless communications system, a UE may be configured to transmit uplink signaling via different types of physical uplink shared channels (PUSCHs), such as dynamic grant physical uplink shared channels (DG-PUSCH) or configured grant PUSCHs (CG-PUSCHs). In cases where uplink signaling is scheduled via dynamic grants (e.g., for a DG-PUSCH), a base station may transmit a downlink control information (DCI) message including an uplink grant of resources on the PUSCH, and the UE may transmit an uplink message in the granted resources. In cases where uplink signaling is scheduled via a configured grant (e.g., for a CG-PUSCH), the base station may configure one or more (e.g., periodic) CG-PUSCH occasions in which the UE may select to transmit pending uplink data that satisfies one or more criteria associated with the CG-PUSCH occasion. However, in some cases, the UE may not have any data to transmit during a particular CG-PUSCH resource. In such examples, PUSCH skipping may be supported, and the UE may not generate a packet data unit (PDU), and may not transmit any uplink data signaling during the GC-PUSCH occasion. Such operations may improve power consumption of the UE and reduce interference with other nodes in a wireless communications system.

A wireless communications system may support demodulation reference signal (DMRS) bundling. DMRS bundling may allow a receiving device (e.g., a base station) to use DMRSs from multiple transmission time intervals (TTIs) (e.g., slots, symbols, mini-slots, transport blocks, or the like) to perform channel estimation for the related TTIs. Thus, a joint channel estimation (e.g., across multiple transmission occasions, such as multiple TTIs, multiple slots, and/or multiple transport blocks carrying different information) may be more robust and more accurate than a channel estimation for a single TTI (e.g., single slot). To support DMRS bundling, a UE may maintain phase continuity across respective transmissions (e.g., different transport blocks (TBs)). Maintaining phase continuity may be referred to as bundling and may include using a same set of parameters for transmitting multiple TBs (e.g., a same frequency resource, transmit power, spatial transmit relation, antenna ports, precoding, or the like). Bundling one or more respective sets of transmissions may support joint processing of DMRSs at a receiving base station (or other receiving device, such as a receiving UE in a sidelink communication). However, if a UE skips a PUSCH transmission, then that skipped PUSCH transmissions may leave a gap in a set of two or more (e.g., consecutive) slots in which DMRS bundling could otherwise be performed. That is, if a UE refrains from transmitting an uplink transmission during a slot that could otherwise be bundled with one or more adjacent slots, then the UE may not be able to maintain phase continuity across the set of slots.

In some examples, a UE may maintain phase continuity and perform DMRS bundling when skipping PUSCH transmissions for configured grants (e.g., CG-PUSCHs). For example, the UE may be configured to transmit two or more consecutive transmissions (e.g., a set of two or more CG-PUSCHs, or DG-PUSCHs and CG-PUSCHs), and may determine that one or more criteria are not satisfied (e.g., may determine that the UE does not have enough buffered data to transmit during one of the CG-PUSCH occasions). In some cases, the UE may generate dummy data (e.g., filler data) for a PDU to transmit during the skipped CG-PUSCH occasion. The dummy data may include one or more DMRSs used for DMRS bundling and the UE may maintain phase continuity across the skipped CG-PUSCH occasion and any other PDSCHs in the set (e.g., during a DMRS bundling interval).

In some examples, the UE may deprioritize DMRS bundling for sets of PUSCHs during which a PUSCH is to be skipped (e.g., despite DMRS bundling being enabled). For example, in a set of PUSCHs, if a CG-PUSCH occasion is adjacent to one or more scheduled PUSCHs (e.g., another CG-PUSCH occasion, a DG-PUSCH, etc.), then assuming one or more conditions are satisfied, the UE may support DMRS bundling for the set of PUSCHs. However, if one or more criteria are not satisfied (e.g., the UE may determine that the UE does not have enough buffered data to transmit during one of the CG-PUSCH occasions), then the UE may not maintain phase continuity across the set of PUSCHs, and may refrain from transmitting any data during the CG-PUSCH occasion.

Aspects of the disclosure are initially described in the context of wireless communications systems. Aspects of the disclosure are further illustrated by and described with reference to resource configurations, timelines, and process flows. Aspects of the disclosure are further illustrated by and described with reference to apparatus diagrams, system diagrams, and flowcharts that relate to techniques for demodulation reference signal bundling for configured uplink channels.

FIG. 1 illustrates an example of a wireless communications system 100 that supports techniques for demodulation reference signal bundling for configured uplink channels in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a TTI. In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more ultra-reliable, low-latency such as push-to-talk, video, or data. Support for ultra-reliable, low-latency functions may include prioritization of services, and ultra-reliable, low-latency services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 may support DMRS bundling. To support DMRS bundling, the transmitting device (e.g., the UE 115) may maintain phase continuity across multiple transmission occasions (e.g., transport blocks or TTIs) and the receiving device (e.g., the base station 105) may jointly process the multiple transmission occasions and perform channel estimation using DMRSs transmitted over the multiple transmission occasions (e.g., transport blocks or TTIs). In some examples, a UE 115 may maintain phase continuity and perform DMRS bundling when skipping PUSCH transmissions for configured grants (e.g., CG-PUSCHs). For example, the UE 115 may be configured to transmit two or more consecutive transmissions (e.g., a set of two or more CG-PUSCHs, or DG-PUSCHs and CG-PUSCHs), and may determine that one or more criteria are not satisfied (e.g., may determine that the UE 115 does not have enough buffered data to transmit during one of the CG-PUSCH occasions). The UE 115 may generate dummy data (e.g., filler data) for a PDU to transmit during the skipped CG-PUSCH occasion, and may maintain phase continuity across the skipped CG-PUSCH occasion and any other PDSCHs in the set (e.g., during a DMRS bundling interval).

In some examples, the UE 115 may deprioritize DMRS bundling for sets of PUSCHs during which a PUSCH is to be skipped (e.g., despite DMRS bundling being enabled). For example, in a set of PUSCHs, if a CG-PUSCH occasion is adjacent to one or more scheduled PUSCHs (e.g., another CG-PUSCH occasion, a DG-PUSCH, etc.), then assuming one or more conditions are satisfied, the UE may support DMRS bundling for the set of PUSCHs. However, if one or more criteria are not satisfied (e.g., the UE 115 may determine that the UE 115 does not have enough buffered data to transmit during one of the CG-PUSCH occasions), then the UE 115 may not maintain phase continuity across the set of PUSCHs, and may refrain from transmitting any data during the CG-PUSCH occasion.

Figure 2:
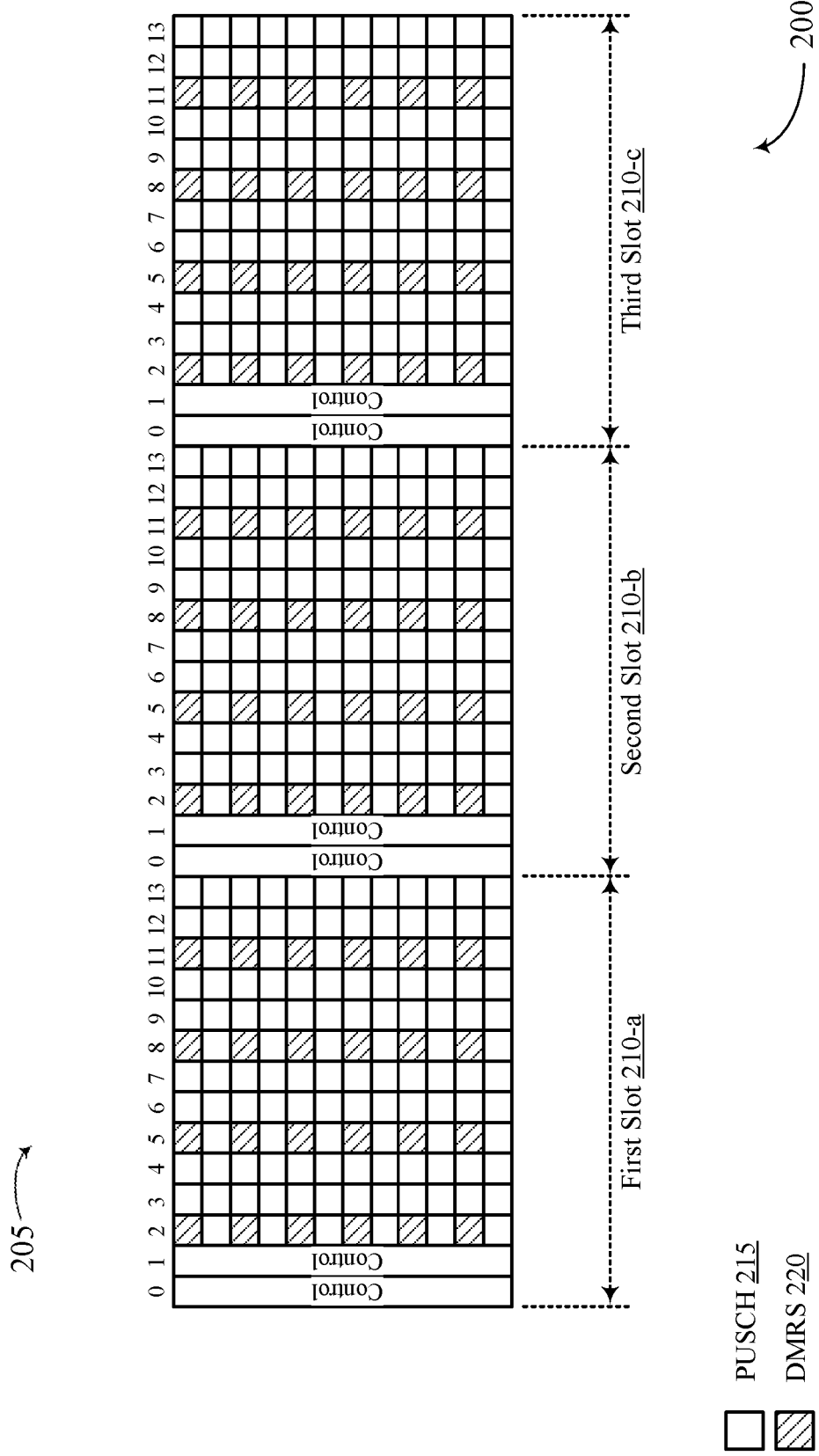
FIG. 2 illustrates an example of a resource configuration that supports techniques for demodulation reference signal bundling for configured uplink channels in accordance with aspects of the present disclosure.

FIG. 2 illustrates an example of a resource configuration 200 that supports capability signaling for uplink transmissions in accordance with aspects of the present disclosure. In some examples, resource configuration 200 may implement, or be implemented by, aspects of wireless communications system 100. The resource configuration 200 illustrates a set of resources 205 across multiple slots 210 which may be used for transmission/reception of phase-coherent DMRSs. Although illustrated with reference to slots 210, techniques described with reference to FIG. 2 elsewhere herein, may also be performed for any transmission occasion (such as a TTI, transmission opportunity, TB, slots, a mini-slots, sub-slots, symbols, frames, subframes, or the like) in which DMRSs are transmitted, and such terms may be used interchangeably in some cases. Additionally, although the resource configuration 200 includes PUSCH transmissions 215, techniques described herein may also be performed with reference to a physical uplink control channel (PUCCH).

Some wireless communications systems (e.g., wireless communications system 100) may enable DMRS bundling and joint channel estimation across transmission occasions that are sending dissimilar information. Wireless devices (e.g., UEs 115) to transmit DMRSs 220 having phase continuity (e.g., phase-coherent DMRSs 220) with other DMRSs to improve channel estimation by the receiving device (e.g., base stations 105). For example, a UE 115 may transmit DMRSs 220 across two more slots (or transmission occasions) having phase continuity to a base station 105 within a set of resources (e.g., which are known by both the UE 115 and the base station 105). In this example, because the DMRSs 220 having phase continuity are received by the base station 105 within a set of known resources, the base station 105 may be configured to aggregate the DMRSs 220 having phase continuity to determine a more accurate channel estimation of the channel between the UE 115 and the base station 105. The base station 105 may be configured to use the improved channel estimation to demodulate (e.g., decode) other transmissions (e.g., PUSCH transmissions 215) received from the UE 115 via the channel. In some aspects, the PUSCH transmissions 215 may also be transmitted with phase continuity across the respective slots 210.

Some wireless communications systems have enabled DMRSs 220 to be bundled within a single TTI, but not across multiple TTIs. For example, in some wireless communications systems, a UE 115 may be configured to transmit a set of DMRSs 220 having phase continuity within the first slot 210-*a*, but may be unable to maintain phase coherency for DMRSs 220 transmitted in different slots 210 (e.g., second slot 210-*b* or third slot 210-*c*). For instance, in some wireless communications systems, a UE 115 may be unable to maintain phase continuity across DMRSs 220 which are transmitted within the first slot 210-*a* and the second slot 210-*b*. In this regard, phase continuity may be maintained for DMRSs 220 within each respective slot 210, but may not be maintained for DMRSs 220 across multiple slots 210.

In some other wireless communications systems (e.g., wireless communications system 100), DMRSs 220 may be bundled across multiple slots and/or across multiple transmissions (e.g., PUCCH or PUSCH transmissions), such that phase continuity may be maintained across multiple slots 210 and/or across the multiple transmissions. For example, in the wireless communications system 100, a UE 115 may be configured to transmit a DMRSs 220 within the first slot 210-*a*, the second slot 210-*b*, and the third slot 210-*c*, where phase continuity is maintained across each of the slots 210-*a*, 210-*b*, and 210-*c*. In this example, a base station 105 may be configured to jointly process (e.g., aggregate) the phase-coherent DMRSs 220 received across the slots 210-*a*, 210-*b*, and 210-*c* when performing channel estimation (e.g., which may be referred to as joint channel estimation, or cross-slot channel estimation, or the like), and may use a determined channel estimate to demodulate the PUSCH transmissions 215 (e.g., PUSCH transmissions 215 having phase continuity) received across the slots 210-*a*, 210-*b*, and 210-*c*.

In some aspects, one or more parameters or characteristics may be maintained for phase-coherent DMRSs 220 (e.g., to maintain phase continuity between DMRSs in different transmission occasions, such as slots), which are bundled across one or more slots 210. Parameters which may be used to maintain phase continuity for DMRSs 220 associated with one or more PUSCH transmissions 215 may include, but are not limited to, phase, frequency allocations, transmission powers, spatial transmission relations, antenna ports used for transmission, precoding schemes, and the like. For example, as illustrated in FIG. 2, in cases where DMRSs 220 are bundled across the first slot 210-*a*, the second slot 210-*b*, and the third slot 210-*c*, the frequency allocation and transmit for the DMRSs 220 within each respective slot 210 may remain the same. Conversely, phase-continuity may not be maintained across slots 210 and/or other transmissions (e.g., phase discontinuity) in cases where DMRSs 220 in respective slots 210 exhibit one or more different parameters (e.g., different phases, different frequency resource allocations within or between PUSCH slots, non-contiguous time resource allocation of PUSCH slots, different transmit powers, different antenna ports, different transmission powers, different timing advances).

In some aspects, the ability to bundle DMRSs 220 across multiple slots 210 (e.g., maintain phase coherency for DMRSs 220 across multiple slots 210) and/or across multiple transmissions (e.g., multiple PUSCH transmissions 215) may enable improved channel estimation at a receiving device (e.g., base station 105). In particular, by enabling for larger quantities of DMRSs 220 to be aggregated across multiple slots 210, a base station 105 may be able to determine a more comprehensive channel estimation (e.g., cross-slot channel estimation), which may improve an ability of the base station 105 to demodulate received PUSCH transmissions 215.

In some examples of a wireless communications system, a UE may be configured to transmit uplink signaling (e.g., PUSCH transmissions 215) via dynamic grants (e.g., DG-PUSCHs) or configured grants (CG-PUSCHs). In cases where uplink signaling is scheduled via a dynamic grant, a base station may transmit a downlink control information (DCI) message including an uplink grant of resources on the PUSCH, and the UE may transmit an uplink message in the granted resources. In cases where uplink signaling is scheduled via a CG-PUSCH, the base station may configure one or more (e.g., periodic) CG-PUSCH occasions in which the UE may transmit any pending uplink data. Thus, during each CG-PUSCH resource, the UE may transmit any buffered data. However, in some cases, the UE may not have any data to transmit during a particular CG-PUSCH resource. In such examples, PUSCH skipping may be supported, and the UE may not generate a packet data unit (PDU), and may not transmit any uplink data signaling during the GC-PUSCH occasion.

In some examples, a wireless communications system may support DMRS bundling. DMRS bundling may allow a receiving device (e.g., a base station) to use DMRSs from multiple TTIs (e.g., slots, symbols, mini-slots, or the like) to perform channel estimation. Thus, a joint channel estimation (e.g., across multiple slots) may be more robust and more accurate than a channel estimation for a single slot. To support DMRS bundling possible, a UE may maintain phase continuity across respective transmissions (e.g., different TBs). Maintaining phase continuity may be referred to as bundling and may include using a same set of parameters for transmitting multiple TBs (e.g., a same frequency resource, transmit power, spatial transmit relation, antenna ports, precoding, or the like). Bundling one or more respective sets of transmissions may support joint processing of DMRSs at a receiving base station. However, if a UE skips a PUSCH transmission, then that skipped PUSCH transmissions may leave a gap in a set of two or more (e.g., consecutive) slots in which DMRS bundling could otherwise be performed. That is, if a UE refrains from transmitting an uplink transmission during a slot that could otherwise be bundled with one or more adjacent slots, then the UE may not be able to maintain phase continuity across the set of slots.

In some examples, as described in greater detail with reference to FIGS. 3 and 5, a UE may maintain phase continuity and perform DMRS bundling when skipping PUSCH transmissions for configured grants (e.g., for CG-PUSCHs). For example, the UE may be configured to transmit two or more consecutive transmissions (e.g., a set of two or more CG-PUSCHs, or DG-PUSCHs and CG-PUSCHs), and may determine that one or more criteria are not satisfied (e.g., may determine that the UE does not have enough buffered data to transmit during one of the CG-PUSCH occasions). The UE may generate dummy data (e.g., filler data) for a PDU to transmit during the skipped CG-PUSCH occasion, and may maintain phase continuity across the skipped CG-PUSCH occasion and any other PDSCHs in the set (e.g., during a DMRS bundling interval).

In some examples, as described in greater detail with reference to FIGS. 4 and 6, the UE may deprioritize DMRS bundling for sets of PUSCHs during which a PUSCH is to be skipped (e.g., despite DMRS bundling being enabled or used). For example, in a set of PUSCHs, if a CG-PUSCH occasion is adjacent to one or more scheduled PUSCHs (e.g., another CG-PUSCH occasion, a DG-PUSCH, etc.), then assuming one or more conditions are satisfied, the UE may be support DMRS bundling for the set of PUSCHs. However, if one or more criteria are not satisfied (e.g., the UE 115 may determine that the UE does not have enough buffered data to transmit during one of the CG-PUSCH occasions), then the UE 115 may not maintain phase continuity across the set of PUSCHs, and may refrain from transmitting any data during the CG-PUSCH occasion.

Figure 3:
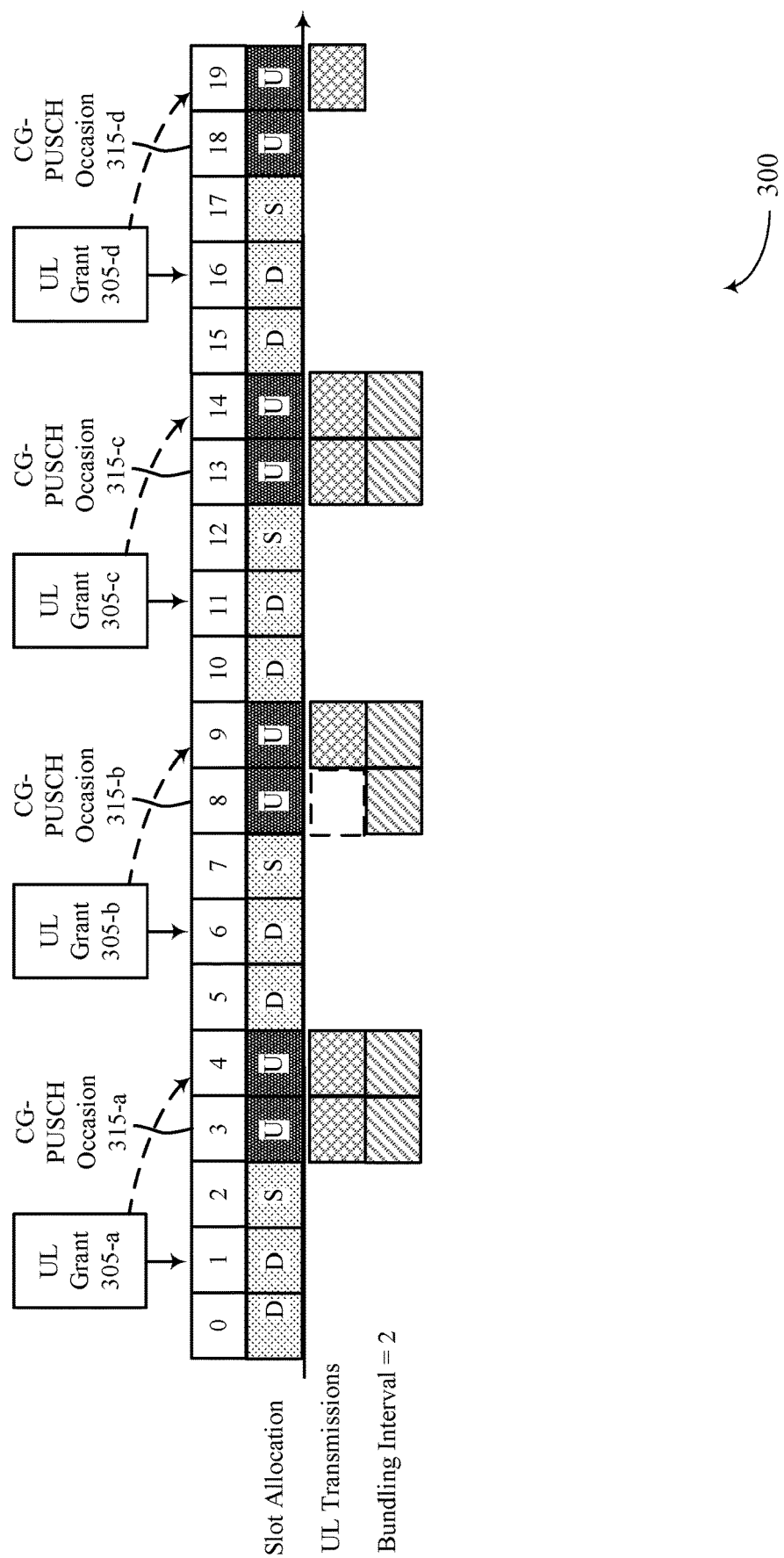
FIG. 3 illustrates an example of a timeline that supports techniques for demodulation reference signal bundling for configured uplink channels in accordance with aspects of the present disclosure.

FIG. 3 illustrates an example of a timeline 300 that supports techniques for demodulation reference signal bundling for configured and dynamic uplink channels in accordance with aspects of the present disclosure. Timeline 300 may be implemented by one or more wireless devices, such as a UE or a base station, which may be examples of corresponding devices described with reference to wireless communications system 100 or resource configuration 200.

In some examples, a base station may configure the UE with one or more bundling parameters, such as a bundling intervals (K). A bundle interval may be defined such that a UE may coherently transmit one or more uplink channels (e.g., having different TB s) within the bundle interval subject to one or more phase continuity conditions. That is, if DMRS bundling is enabled, the UE may transmit uplink signaling on physical uplink channels (e.g., PUCCH transmissions or PUSCH transmissions) while maintaining phase continuity within the bundle interval. If the one or more phase continuity conditions are satisfied within a bundle interval, the base station may be configured to perform channel estimation using DMRSs transmitted during different slots of the bund interval. The base station may configure bundling parameters, such as bundle intervals, at a UE via higher layer signaling (e.g., radio resource control (RRC) signaling), dynamic signaling (e.g., DCI signaling), or the UE may implicitly determine bundle intervals and other bundling parameters base on uplink transmission configurations, slot formatting, or the like. Each bundle interval may be the same size (e.g., may have the same value for K). In some examples, as illustrated with reference to FIG. 3, the bundle interval may be K=2. The bundle interval may also be any number of TTIs (e.g., 2 slots, 4 slots, 8, slots, 16 slots, or any other value), or may vary based on a number of available uplink TTIs (e.g., uplink slots) in a slot format.

The base station may also configure the UE with resource allocation information. For example, the UE may be configured with a time-division multiplexing (TDM) configuration, where each TTI is allocated as an uplink TTI (e.g., U), a downlink TTI (e.g., D), or a special (e.g., flexible) TTI (e.g., S). Some or all symbols in an S TTI may be allocated for uplink signaling, and some or all symbols in the S TTI may be allocated for downlink signaling. In some examples, a TDM resource allocation may include a pattern of U, D, and S TTIs. An illustrative example pattern may be: DDSUUDDSUU. Such a pattern may repeat itself over time (e.g., across various TTIs).

In some examples, the UE may support DMRS bundling across CG-PUSCH transmissions and DG-PUSCH transmissions. For example, the base station may configure the UE with one or more CG-PUSCHs. The base station may transmit, to the UE, configuration information (e.g., via control signaling) indicating one or more CG-PUSCH occasions (e.g., CG-PUSCH occasions 315). In some examples, the base station may further configure the UE with one or more dynamic grants (e.g., for DG-PUSCHs). For example, the base station may transmit an uplink grant 305-*a* during slot 1 (e.g., a D slot). The uplink grant may indicate uplink resources in a subsequent U slot (e.g., slot 4). The indicated uplink resources may be adjacent to a slot that is configured for uplink signaling via configured grants (e.g., may be adjacent to slot 3 in which a CG-PUSCH occasion 315-*a* is located). In some examples, additional signaling may convey that the dynamic grant PUSCH may be or is configured to be bundled with a subsequent CG-PUSCH (e.g., CG-PUSCH occasion 315-*a*). For instance, the base station may transmit an indication to the UE that DMRS bundling (e.g., joint channel estimation) is enabled. In such examples, the UE may identify data for transmission on the CG-PUSCH occasion 315-*a* in slot 3, and my also transmit uplink data in slot 4 according to the uplink grant 305-*a*. The UE may set one or more parameter values (e.g., transmit power, antenna port selection, precoding selection, frequency resources, or the like) such that basic requirements for DMRS bundling are satisfied. In such examples, the UE may further transmit one or more DMRSs in each of slot 3 and slot 4 while maintaining phase continuity for joint channel estimation at the receiving base station.

In some examples, the UE may transmit dummy data during a CG-PUSCH occasion 315 while maintaining phase continuity with an adjacent DG-PUSCH to perform DMRS bundling when it does not have enough pending data to transmit during the CG-PUSCH occasion 315. Implicit DMRS bundling techniques may prove difficult because the UE may not be able to plan ahead (e.g., the UE may not be able to determine whether it will skip a CG-PUSCH occasion within a threshold amount of time prior to the CG-PUSCH occasion). If DMRS bundling is enabled, supported, or used, then the UE may determine that one or more conditions are satisfied. For instance, the UE may determine that it does not have data to transmit during CG-PUSCH occasion 315-*b*, and that an uplink grant 305-*b* (e.g., received during slot 6) has scheduled uplink data for transmission in slot 9. In such examples, if DMRS bundling is enabled, then UE behavior for uplink skipping may be suspended. For example, instead of skipping uplink transmissions during the CG-PUSCH occasion 315-*b* in slot 8, the UE may generate dummy data for a PDU, and may transmit the dummy data (including the DMRSs associated with the PDU) during the CG-PUSCH occasion 315-*b*. In such examples, the UE may prepare for DMRS bundling as soon as the conditions are met (e.g., in response to the UE determining that there is uplink data dynamically scheduled for slot 9, that there is no pending uplink data to be transmitted during the CG-PUSCH occasion 315-*b*, or both). Having generated the dummy data for slot 8, the UE may transmit DMRSs and the dummy data during slot 8, and DMRSs and the scheduled uplink data during slot 9. The UE may maintain phase continuity across slot 8 and slot 9, such that the transmitted DMRSs are bundled.

In some examples, the UE may perform DMRS bundling if no PUSCH skipping is to be performed. For example, if bundling is enabled, UE 115 may determine whether an actual payload is to be transmitted during a pending CG-PUSCH occasion 315. For instance, the UE may determine that it does have uplink data to transmit (e.g., sufficient data in a buffer to satisfy a threshold amount of data) during CG-PUSCH occasion 315-c during slot 13. The UE may further receive an uplink grant 305-c during slot 11, which may include an indication of uplink resources during slot 14 for an uplink data transmission. In such examples, if an actual payload is to be transmitted during CG-PUSCH occasion 315-c, then the UE may proceed to plan for DMRS bundling. That is, upon determining that uplink data is to be transmitted during slot 13, that uplink data is to be transmitted during slot 14, or both, the UE may prepare to maintain phase continuity (e.g., for DMRS bundling) across slots 13 and 14. For example, the UE may configure one or more parameters (e.g., may select parameter values for frequency resources, precoding settings, one or more antenna ports, a transmit power, or the like) to be used for transmitting data and DMRSs during the bundle interval (e.g., across slot 13 and slot 14).

In some examples, the UE may deprioritize DMRS bundling when performing PUSCH skipping. For example, if bundling is enabled, UE 115 may determine whether an actual payload is to be transmitted during a pending CG-PUSCH occasion 315. For instance, the UE may determine that it does not have uplink data to transmit (e.g., that there is not sufficient data in a buffer to satisfy a threshold amount of data) during CG-PUSCH occasion 315-d during slot 18. The UE may further receive an uplink grant 305-d during slot 16, which may include an indication of uplink resources during slot 19 for an uplink data transmission. In such examples, if no actual payload is to be transmitted during CG-PUSCH occasion 315-d, then the UE may refrain from performing DMRS bundling. That is, the UE may drop DMRS bundling around the PUSCH transmission during slot 19. Upon determining that uplink data is to be transmitted during slot 19, but that no uplink data is to be transmitted during slot 18, the UE may not maintain phase continuity (e.g., for DMRS bundling) across slots 18 and 19. For example, the UE may configure one or more parameter values (e.g., may select parameter values for frequency resources, precoding settings, one or more antenna ports, a transmit power, or the like) for transmitting DMRSs during slot 18, and a second set of different parameter values for transmitting DMRSs during slot 19.

In some examples, the UE may generate dummy data and maintain phase continuity for DMRS bundling (e.g., as described with reference to slots 8 and 9) based on one or more rules, which may be included in one or more standards documents, indicated to the UE by the base station, preconfigured at the UE, or any combination thereof. In some examples, the one or more rules may define the UE behavior based on whether the UE has data to transmit (e.g., in a CG PUSCH occasion 315), whether a CG-PUSCH occasion 315 is located adjacent to one or more U slots in which uplink data is scheduled, or the like. In some examples, the UE may perform DMRS bundling during one or more slots if the UE can determine that the one or more conditions are satisfied within a threshold amount of time of the bundling interval (e.g., the two or more slot in which uplink signaling is scheduled).

In some examples, the UE may deprioritize DMRS bundling (e.g., may refrain from DMRS bundling or maintaining phase continuity for two or more slots as described with reference to slots 18 and 19) based on one or more rules, which may be included in one or more standards documents, indicated to the UE by the base station, preconfigured at the UE, or any combination thereof. In some examples, the one or more rules may define the UE behavior based on whether the UE has data to transmit (e.g., in a CG PUSCH occasion 315), whether a CG-PUSCH occasion 315 is located adjacent to one or more U slots in which uplink data is scheduled, or the like. In some examples, the UE may refrain from DMRS bundling during one or more slots if the UE can determine that the one or more conditions are or are not satisfied within a threshold amount of time of the bundling interval (e.g., the two or more slot in which uplink signaling is scheduled).

In some examples, a bundling interval may span more than two slots. For example, FIG. 3 is described with reference to scenarios in which two adjacent slots are scheduled for uplink signaling (e.g., via a dynamic grant and a configured grant). However, described techniques may apply to any number of slots in which uplink signaling is described. For instance, a CG-PUSCH occasion 315 may be located in a set of three or more U slots. For example, a DG-PUSCH may be scheduled prior to or after the CG-PUSCH occasion 315, or another CG-PUSCH occasion may be located immediately prior to or immediately after the CG-PUSCH occasion 315, or any combination thereof. In such examples, as described herein, the UE may generate dummy data (e.g., as illustrated with reference to slot 8) and transmit the scheduled uplink data during the full set of slots, or may deprioritize DMRS bundling, refrain from transmitting during the CG-PUSCH occasion 315 (e.g., as illustrated with reference to slot 18), and refrain from DMRS bundling across the full set of slots that includes the skipped CG-PUSCH occasion 315.

In some examples, as described in greater detail with reference to FIG. 4, the UE may generate dummy data and perform DMRS bundling in case of PUSCH skipping, or may deprioritize DMRS bundling in case of PUSCH skipping, for multiple adjacent CG-PUSCH occasions 315.

Figure 4:
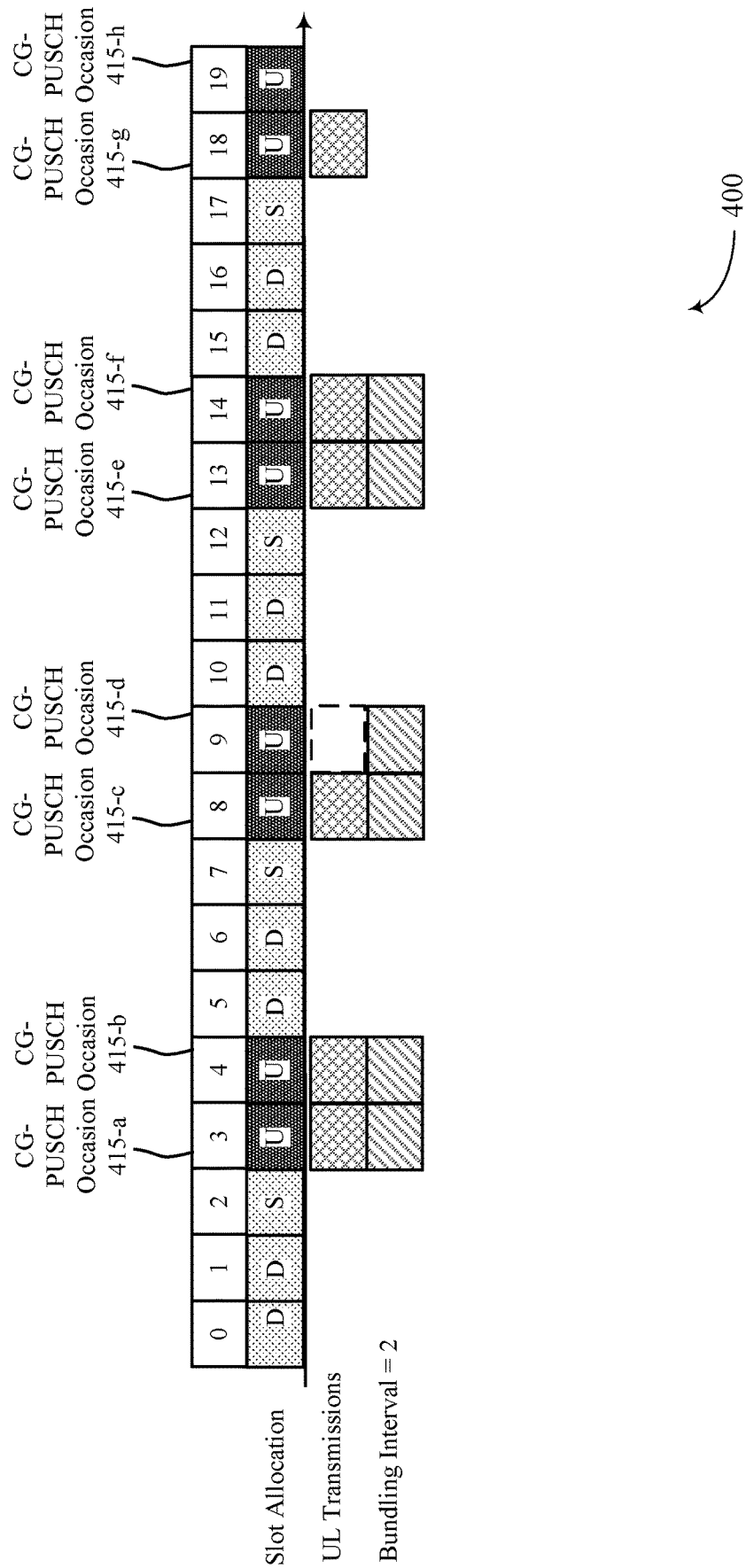
FIG. 4 illustrates an example of a timeline that supports techniques for demodulation reference signal bundling for configured uplink channels in accordance with aspects of the present disclosure.

FIG. 4 illustrates an example of a timeline 400 that supports techniques for demodulation reference signal bundling for configured and dynamic uplink channels in accordance with aspects of the present disclosure. Timeline 400 may be implemented by one or more wireless devices, such as a UE or a base station, which may be examples of corresponding devices described with reference to wireless communications system 100 or resource configuration 200.

In some examples, a base station may configure the UE with one or more bundling parameters, such as a bundling intervals (K). A bundle interval may be defined such that a UE may coherently transmit one or more uplink channels (e.g., having different TB s) within the bundle interval subject to one or more phase continuity conditions. That is, if the one or more phase continuity conditions are satisfied within a bundle interval, the UE may transmit uplink signaling on physical uplink channels (e.g., PUCCH transmissions or PUSCH transmissions) while maintaining phase continuity within a bundle. The base station may configure bundling parameters, such as bundle intervals, at a UE via higher layer signaling (e.g., radio resource control (RRC) signaling), dynamic signaling (e.g., DCI signaling), or the UE may implicitly determine bundle intervals and other bundling parameters base on uplink transmission configurations, slot formatting, or the like. Each bundle interval may be the same size (e.g., may have the same value for K). In some examples, as illustrated with reference to FIG. 3, the bundle interval may be K=2. The bundle interval may also be any number of TTIs (e.g., 2 slots, 4 slots, 8, slots, 16 slots, or any other value), or may vary based on a number of available uplink TTIs (e.g., uplink slots) in a slot format.

The base station may also configure the UE with resource allocation information. For example, the UE may be configured with a time-division multiplexing (TDM) configuration, where each TTI is allocated as an uplink TTI (e.g., U), a downlink TTI (e.g., D), or a special (e.g., flexible) TTI (e.g., S). Some or all symbols in an S TTI may be allocated for uplink signaling, and some or all symbols in the S TTI may be allocated for downlink signaling. In some examples, a TDM resource allocation may include a pattern of U, D, and S TTIs. An illustrative example pattern may be: DDSUUDDSUU. Such a pattern may repeat itself over time (e.g., across various TTIs).

In some examples, the UE may support DMRS bundling across multiple CG-PUSCHs. For example, the base station may configure the UE with one or more CG-PUSCHs. The base station may transmit, to the UE, configuration information (e.g., via control signaling) indicating one or more CG-PUSCH occasions (e.g., CG-PUSCH occasions 415). The configuration information may configure one set of CG-PUSCH occasions 415 (e.g., CG-PUSCH occasion 415-*a*, CG-PUSCH occasion 415-*b*, CG-PUSCH occasion 415-*c*, CG-PUSCH occasion 415-*d*, CG-PUSCH occasion 415-*e*, CG-PUSCH occasion 415-*f*, CG-PUSCH occasion 415-*g*, and CG-PUSCH occasion 415-*h*), or a first set of CG-PUSCH occasions 415 (e.g., CG-PUSCH occasion 415-*a*, CG-PUSCH occasion 415-*c*, CG-PUSCH occasion 415-*e*, CG-PUSCH occasion 415-*g*) and a second set of CG-PUSCH occasions 415 (CG-PUSCH occasion 415-*b*, CG-PUSCH occasion 415-*d*, CG-PUSCH occasion 415-*f*, CG-PUSCH occasion 415-*h*). In some examples, additional signaling may convey that multiple CG-PUSCH Occasions 415 (e.g., adjacent CG-PUSCH occasions 415) may be or are configured to be bundled. For instance, the base station may transmit an indication to the UE that DMRS bundling (e.g., joint channel estimation) is enabled.

In some examples, CG-PUSCH occasions 415 may be part of a same CG-PUSCH configuration, or part of separate CG-PUSCH configurations. For example, a first configured grant may include a first instance (e.g., CG-PUSCH occasion 415-*a*) of a first set of configured grant resources and a second instance (e.g., CG-PUSCH occasion 415-*b*) of the first set of configured grant resources. In some examples, a first configured grant may include a first instance (e.g., CG-PUSCH occasion 415-*a*) of a first set of configured grant resource and a second configured grant may include an instance (e.g., CG-PUSCH occasion 415-*b*) of a second set of configured grant resources. Thus, techniques described herein may apply to CG-PUSCH occasions 415 that are adjacent or non-adjacent, and may apply to CG-PUSCH occasions 415 that are part of a same configured grant configuration, or are part of different configured grant configurations.

In cases where DMRS bundling is enabled, the UE may identify data for transmission on the CG-PUSCH occasions 415. For instance, the UE may identify data or transmission during slot 3, slot 4, slot 9, slot 13, slot 14, and slot 18. However, the UE may determine that there is no pending data to transmit in some CG-PUSCH occasions (e.g., CG-PUSCH occasions 415-*c*). Where two or more consecutive CG-PUSCH occasions 415 have data for transmission, the UE may perform DMRS bundling. That is, the UE may set one or more parameter values (e.g., transmit power, antenna port selection, precoding selection, frequency resources, or the like) such that basic requirements for DMRS bundling are satisfied. In such examples, the UE may further transmit one or more DMRSs in each adjacent slot (e.g., slot 3 and slot 4) while maintaining phase continuity for joint channel estimation at the receiving base station.

In some examples, the UE may transmit dummy data during a CG-PUSCH occasion 415 while maintaining phase continuity with an adjacent CG-PUSCH to perform DMRS bundling when it does not have enough pending data to transmit during the CG-PUSCH occasion 415. For instance, the UE may determine that it does not have data to transmit during CG-PUSCH occasion 415-*c*, but that it does have data to transmit during CG-PUSCH occasion 415-*d*. In such examples, if DMRS bundling is enabled, then UE behavior for uplink skipping may be suspended. For example, instead of skipping uplink transmissions during the CG-PUSCH occasion 415-*d* in slot 9, the UE may generate dummy data for a PDU, and may transmit the dummy data during the CG-PUSCH occasion 415-*d*. In such examples, the UE may prepare for DMRS bundling as soon as one or more conditions are met (e.g., as soon as the UE determines that there is uplink data scheduled for slot 8, but that there is no pending uplink data to be transmitted during the CG-PUSCH occasion 415-*d*). Having generated the dummy data for slot 9, the UE may transmit DMRSs and data during slot 8, and DMRSs and the dummy data during slot 9. The UE may maintain phase continuity across slot 8 and slot 9, such that the transmitted DMRSs are bundled.

In some examples, the UE may deprioritize DMRS bundling when performing PUSCH skipping in one of a set of adjacent CG-PUSCH occasions 415. For example, if bundling is enabled, UE 115 may determine whether an actual payload is to be transmitted during a pending CG-PUSCH occasion 415. For instance, the UE may determine that it does not have uplink data to transmit (e.g., that there is not sufficient data in a buffer to satisfy a threshold amount of data) during CG-PUSCH occasion 415-*h* during slot 19. In such examples, if no actual payload is to be transmitted during CG-PUSCH occasion 415-*h*, then the UE may refrain from performing DMRS bundling. That is, the UE may drop DMRS bundling around the PUSCH transmission during slot 18. Upon determining that uplink data is to be transmitted during slot 18, but that no uplink data is to be transmitted during slot 19, the UE may determine not to maintain phase continuity (e.g., for DMRS bundling) across slots 18 and 19. For example, the UE may configure one or more parameter values (e.g., may select parameter values for frequency resources, precoding settings, one or more antenna ports, a transmit power, or the like) for transmitting DMRSs and data during slot 18, and a second set of different parameter values for transmitting DMRSs during slot 19.

In some examples, the UE may generate dummy data and maintain phase continuity for DMRS bundling (e.g., as described with reference to slots 8 and 9) based on one or more rules, which may be included in one or more standards documents, indicated to the UE by the base station, preconfigured at the UE, or any combination thereof. In some examples, the one or more rules may define the UE behavior based on whether the UE has data to transmit (e.g., in a CG PUSCH occasion 415), whether a CG-PUSCH occasion 415 is located adjacent to one or more U slots in which uplink data is scheduled, or the like. In some examples, the UE may perform DMRS bundling during one or more slots if the UE can determine that the one or more conditions are satisfied within a threshold amount of time of the bundling interval (e.g., the two or more slot in which uplink signaling is scheduled).

In some examples, the UE may deprioritize DMRS bundling (e.g., may refrain from DMRS bundling or maintaining phase continuity for two or more slots as described with reference to slots 18 and 19) based on one or more rules, which may be included in one or more standards documents, indicated to the UE by the base station, preconfigured at the UE, or any combination thereof. In some examples, the one or more rules may define the UE behavior based on whether the UE has data to transmit (e.g., in a CG PUSCH occasion 415), whether a CG-PUSCH occasion 415 is located adjacent to one or more U slots in which uplink data is scheduled, or the like. In some examples, the UE may refrain from DMRS bundling during one or more slots if the UE can determine that the one or more conditions are or are not satisfied within a threshold amount of time of the bundling interval (e.g., the two or more slot in which uplink signaling is scheduled).

In some examples, a bundling interval may span more than two slots. The bundled slots may be back-to-back (e.g., consecutive), or may not be back to back (e.g., non-consecutive). For example, FIG. 3 is described with reference to scenarios in which two adjacent slots are scheduled for uplink signaling (e.g., via a dynamic grant and a configured grant). However, described techniques may apply to any number of slots in which uplink signaling is described. For instance, a CG-PUSCH occasion 415 may be located in a set of three or more U slots. For example, a DG-PUSCH may be scheduled prior to or after the CG-PUSCH occasion 415, or another CG-PUSCH occasion may be located immediately prior to or immediately after the CG-PUSCH occasion 415, or any combination thereof. In such examples, as described herein, the UE may generate dummy data (e.g., as illustrated with reference to slot 8) and transmit the scheduled uplink data during the full set of slots, or may deprioritize DMRS bundling, refrain from transmitting during the CG-PUSCH occasion 415 (e.g., as illustrated with reference to slot 18), and refrain from DMRS bundling across the full set of slots that includes the skipped CG-PUSCH occasion 415.

In some examples, as described in greater detail with reference to FIG. 4, the UE may generate dummy data and perform DMRS bundling in case of PUSCH skipping, or may deprioritize DMRS bundling in case of PUSCH skipping, for multiple adjacent CG-PUSCH occasions 415.

Figure 5:
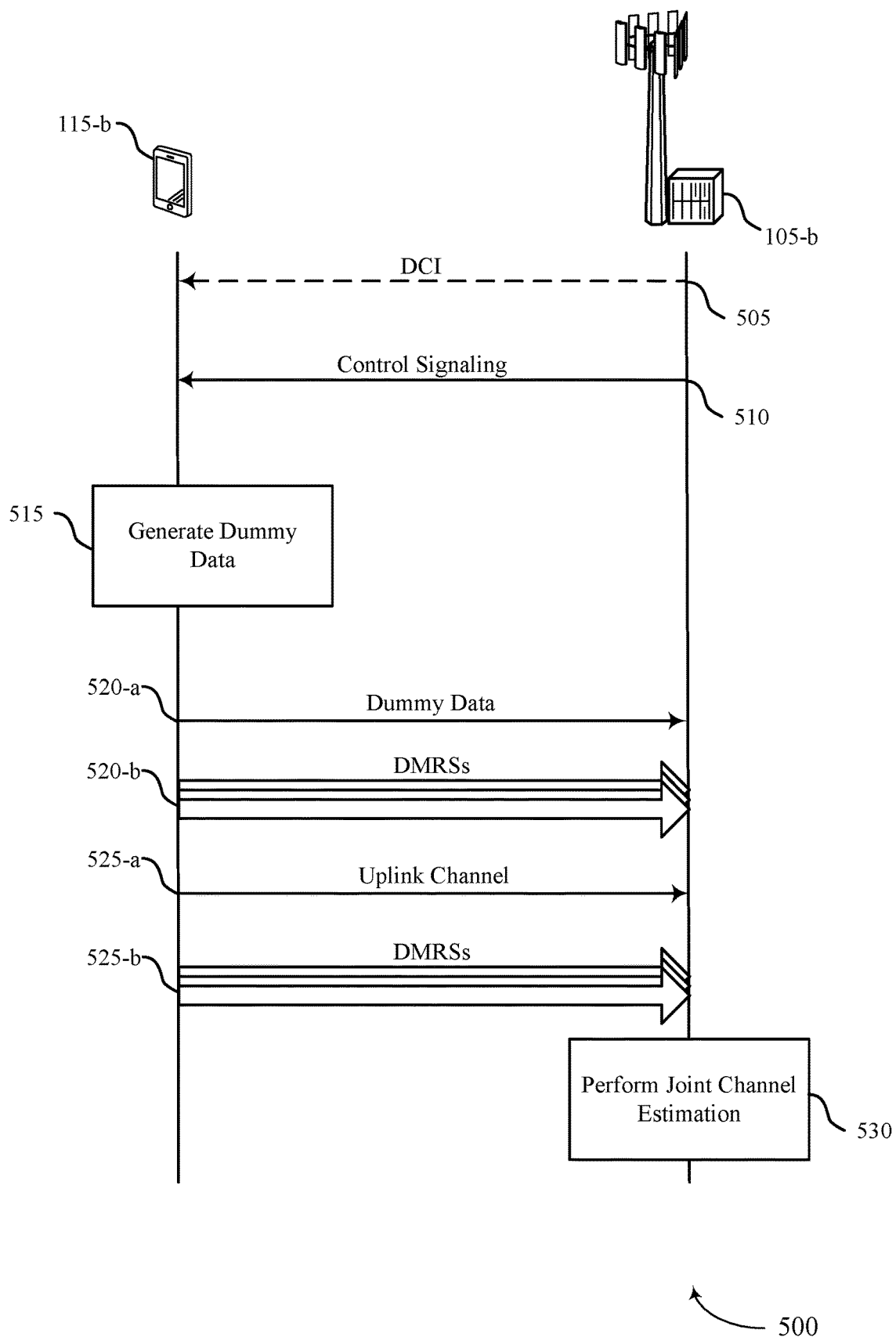
FIG. 5 illustrates an example of a process flow that supports techniques for demodulation reference signal bundling for configured uplink channels in accordance with aspects of the present disclosure.

FIG. 5 illustrates an example of a process flow 500 that supports techniques for demodulation reference signal bundling for configured and dynamic uplink channels in accordance with aspects of the present disclosure. Process flow 500 may include a UE 115-b and a base station 105-b, which may be examples of a corresponding devices described with reference to FIGS. 1-4.

At 510, base station 105-b may transmit control signaling to UE 115-b. The control signaling may include a configured grant scheduling multiple uplink channels (e.g., CG-PUSCHs) including a first uplink channel during a first time slot (e.g., slot, mini-slot, symbol, frame, subframe, or the like). The first time slot may be adjacent to a second time slot scheduled for transmission of a second uplink channel. In some examples, the first and second uplink channels may be two of a set of multiple (e.g., 3, 4, 8, 16, etc.) adjacent time slots. In some examples, the first time slot may not be adjacent to the second time slot. For example, the first and second time slot may be separated by one or more symbols or slots. The intervening symbols or slots may be allocated for transmission of a separate uplink channel, additional repetitions of a transmission, or the like.

In some examples, the first uplink channel and the second uplink channel may be CG-PUSCHs. For example, base station 105-b may transmit, and UE 115-b may receive (e.g., in the control signaling at 510 or separate control signaling) including a configured grant scheduling the second uplink channel during the second time slot.

In some examples, the first uplink channel may be a CG-PUSCH and the second uplink channel may be a DG-PUSCH. In such examples, at 505, base station 105-b may transmit, and UE 115-b may receive, a DCI message. The DCI message may include a dynamic grant scheduling the second uplink channel during the second time slot.

In some examples, base station 105-b may transmit, to UE 115-b, control signaling instructing UE 115-b to maintain phase continuity across multiple uplink channels that include the first uplink channel and the second uplink channel. For example, base station 105-ba may transmit control signaling that enables DMRS bundling, or uses DMRS bundling (e.g., for an amount of time that spans the first time slot and the second time slot, or based on one or more rules or conditions being satisfied, etc.).

At 515, UE 115-b may generate dummy data for transmission to the base station 105-b. For example, UE 115-b may determine that information associated with the configured grant fails to satisfy a transmission criterion. The transmission criterion may include one or more rules or constraints defining whether UE 115-b is to transmit uplink data on the first uplink channel. In some examples, the transmission criterion may be a threshold amount of pending data in a buffer. For instance, if an amount of buffered data for UE 115-b does not satisfy a threshold, then UE 115-b may generate the dummy data at 515. In some examples, UE 115-b may determine not to perform PUSCH skipping, despite PUSCH skipping being enabled. For instance, base station 105-b may indicate, or one or more rules may instruct, that UE 115-b is enabled to perform PUSCH skipping if the transmission criterion is not satisfied. However, upon determining that the UE 115-b does not have enough data to transmit during the first time slot, or upon determining that the UE 115-b is configured to transmit uplink data during the second slot (e.g., a CG_PUCSH or a DG-PUSCH), or both, UE 115-b may generate dummy data for transmission at 520. UE 115-b may further prepare for DMRS bundling during the first and second time slots (e.g., may select one or more parameter values for transmitting uplink data and DMRSs at 525 and 530). In some examples, UE 115-b may generate the dummy data and determine to maintain phase continuity at 520 and 525 based at least in part on receiving control signaling instruction the UE to maintain phase continuity, determining that there is no data to transmit during the first configured uplink channel, or both.

At 520, UE 115-b may transmit the dummy data generated at 515 and one or more DMRSs to base station 105-b. For example, during the first time slot, UE 115-b may transmit the dummy data at 520-a and the DMRSs at 520-b.

At 525, UE 115-b may transmit the second uplink channel and one or more DMRSs to base station 105-b. For example, during the second time slot, UE 115-b may transmit the second uplink channel at 525-a and the DMRSs at 525-b. UE 115-b may maintain phase continuity across the first time slot and the second time slot. For example, UE 115-b may select, for both the first time slot and the second time slot, one or more parameters. The one or more parameters used for transmissions in the first and second slot at 520 and 525 may include a phase value of the first uplink channel and the second uplink channel, a radio frequency band used by the first uplink channel and the second uplink channel, a resource block used by the first uplink channel and the second uplink channel, a transmission power of the first uplink channel and the second uplink channel, one or more antenna ports used for transmitting the first plurality of demodulation reference signals and the second plurality of demodulation reference signals, a precoding scheme of the first uplink channel and the second uplink channel, or any combination thereof.

At 530, base station 105-b may perform a joint channel estimation based at least in part on receiving the DMRSs at 520-b and 525-b having phase continuity.

Although described and illustrated with reference to data transmissions on a PUSCH, techniques described herein may also apply to control transmissions on a PUCCH (e.g., a UE may maintain phase continuity and perform DMRS bundling for adjacent uplink control transmissions having different TBs).

Figure 6:
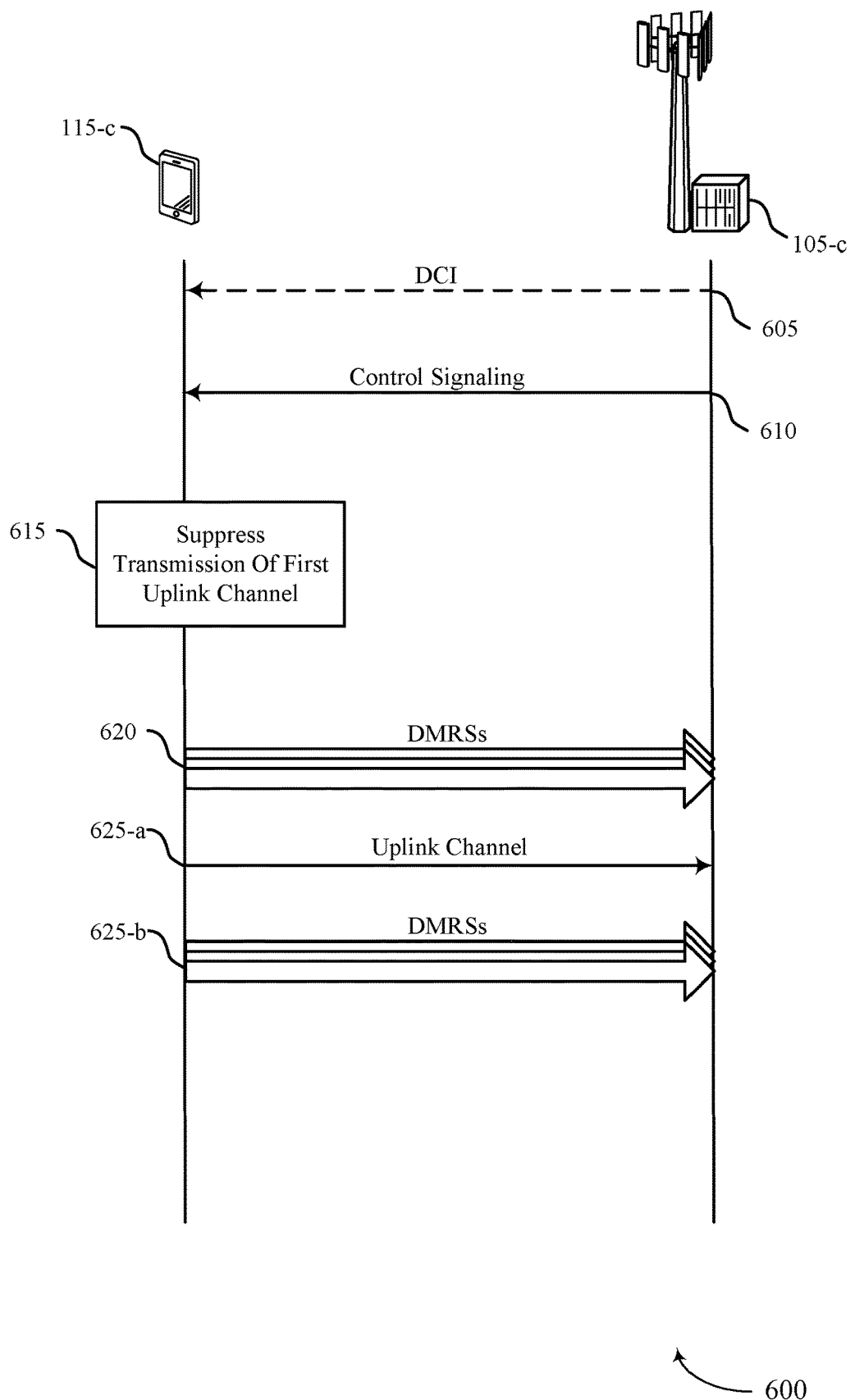
FIG. 6 illustrates an example of a process flow that supports techniques for demodulation reference signal bundling for configured uplink channels in accordance with aspects of the present disclosure.

FIG. 6 illustrates an example of a process flow 600 may support techniques for demodulation reference signal bundling for configured and dynamic uplink channels in accordance with aspects of the present disclosure. Process flow 600 may include a UE 115-c and a base station 105-c, which may be examples of corresponding devices described with reference to FIGS. 1-5.

At 610, base station 105-c may transmit control signaling to UE 115-c. The control signaling may include a configured grant scheduling multiple uplink channels (e.g., CG-PUSCHs) including a first uplink channel during a first time slot (e.g., slot, mini-slot, symbol, frame, subframe, or the like). The first time slot may be adjacent to a second time slot scheduled for transmission of a second uplink channel. In some examples, the first and second uplink channels may be two of a set of multiple (e.g., 3, 4, 8, 16, etc.) adjacent time slots.

In some examples, the first uplink channel and the second uplink channel may be CG-PUSCHs. For example, base station 105-c may transmit, and UE 115-c may receive (e.g., in the control signaling at 610 or separate control signaling) including a configured grant scheduling the second uplink channel during the second time slot.

In some examples, the first uplink channel may be a CG-PUSCH and the second uplink channel may be a DG-PUSCH. In such examples, at 605, base station 105-c may transmit, and UE 115-c may receive, a DCI message. The DCI message may include a dynamic grant scheduling the second uplink channel during the second time slot.

In some examples, base station 105-c may transmit, to UE 115-c, control signaling instructing UE 115-c to maintain phase continuity across multiple uplink channels that include the first uplink channel and the second uplink channel. For example, base station 105-c may transmit control signaling that enables DMRS bundling, or uses DMRS bundling (e.g., for an amount of time that spans the first time slot and the second time slot, or based on one or more rules or conditions being satisfied, etc.).

At 615, UE 115-c may suppress transmission of the first uplink channel. IN some examples, UE 115-c may suppress the transmission in the first time slot based at least in part on information associated with the configured grant failing to satisfy a transmission criterion. The transmission criterion may include one or more rules or constraints defining whether UE 115-c is to transmit uplink data on the first uplink channel. In some examples, the transmission criterion may be a threshold amount of pending data in a buffer. For instance, if an amount of buffered data for UE 115-c does not satisfy a threshold, then UE 115-c may suppress uplink transmission during the first time slot at 615. In some examples, UE 115-c may determine to deprioritize DMRS bundling and performing PUSCH skipping based at least in part on PUSCH skipping being enabled. For instance, base station 105-c may indicate, or one or more rules may instruct, that UE 115-c is enabled to perform PUSCH skipping if the transmission criterion is not satisfied. However, upon determining that the UE 115-c does not have enough data to transmit during the first time slot, or upon determining that the UE 115-c is configured to transmit uplink data during the second slot (e.g., a CG-PUCSH or a DG-PUSCH), or both, UE 115-c may suppress transmission on the first uplink channel. UE 115-c may further prepare for transmissions across the first and second time slots without performing DMRS bundling (e.g., may select one or more parameter values for transmitting DMRSs at 625 and different parameter values for transmitting uplink data and DMRSs at 630).

At 620, UE 115-c may transmit one or more DMRSs to base station 105-c. UE 115-c may transmit the DMRSs using a first set of parameter values. However, based at least in part on the suppressing at 615, UE 115-c may not transmit any uplink data during the first time slot (e.g., may perform PUSCH skipping).

At 625, UE 115-c may transmit the second uplink channel and one or more DMRSs to base station 105-c. For example, during the second time slot, UE 115-c may transmit the second uplink channel at 625-a and the DMRSs at 625-b. UE 115-c may not maintain phase continuity across the first time slot and the second time slot. For example, UE 115-c may select, for the second time slot, one or more parameters different from the parameters used to transmit DMRSs at 620. The one or more parameters used for transmissions in the first slot at 620 may include a phase value of the first uplink channel, a radio frequency band used by the first uplink channel, a transmission power of the first uplink channel, one or more antenna ports used for transmitting the first plurality of demodulation reference signals, a precoding scheme of the first uplink channel, or any combination thereof. The one or more parameters used for transmissions in the second slot at 625 may include a phase value of the second uplink channel, a radio frequency band used by the second uplink channel, a resource block used by the first uplink channel and the second uplink channel, a transmission power of the second uplink channel, one or more antenna ports used for transmitting the second plurality of demodulation reference signals, a precoding scheme of the second uplink channel, or any combination thereof.

Although described and illustrated with reference to data transmissions on a PUSCH, techniques described herein may also apply to control transmissions on a PUCCH (e.g., a UE may maintain phase continuity and perform DMRS bundling for adjacent uplink control transmissions having different TBs).

Figure 7:
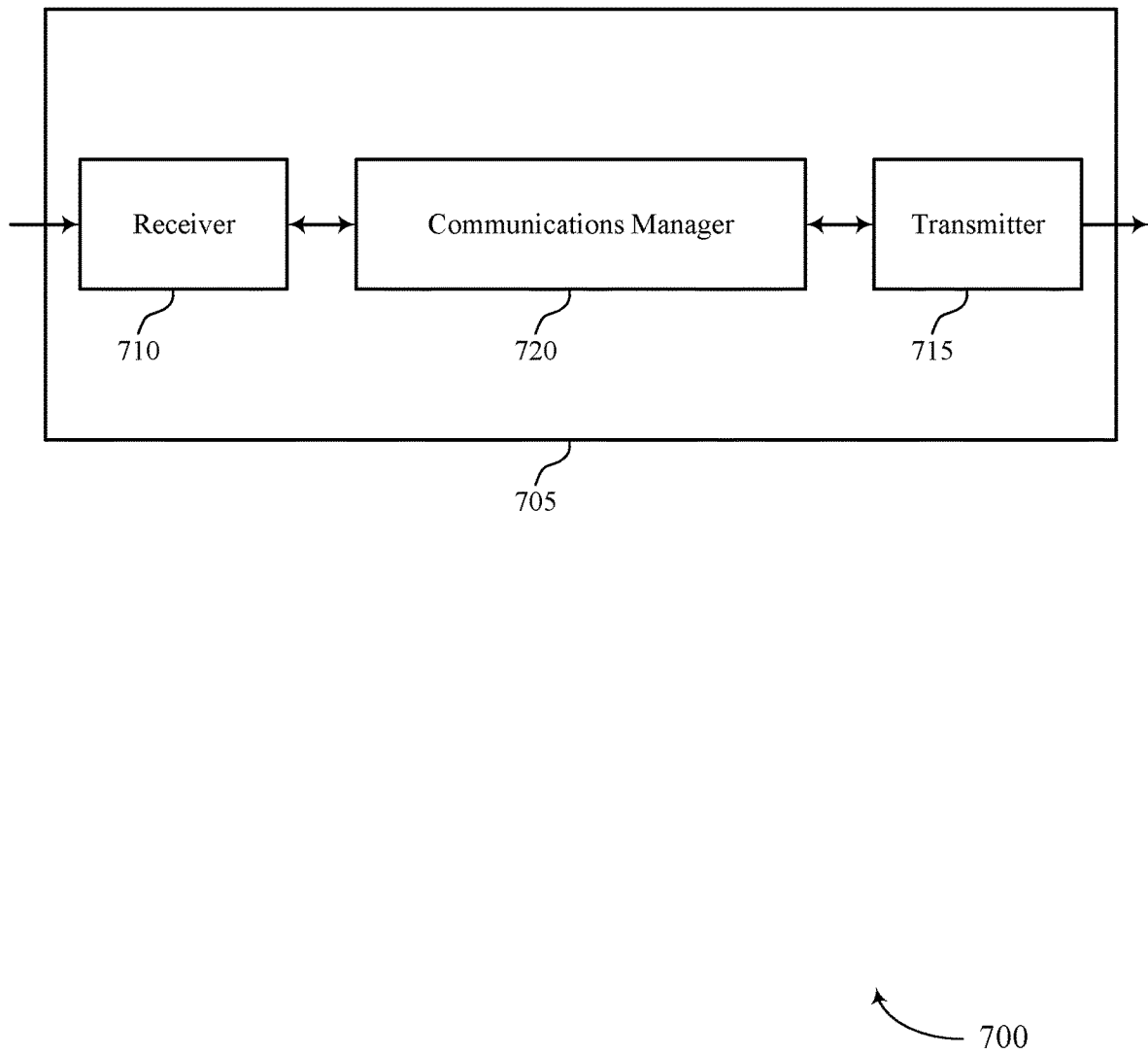
FIGS. 7 and 8 show block diagrams of devices that support techniques for demodulation reference signal bundling for configured uplink channels in accordance with aspects of the present disclosure.

FIG. 7 shows a block diagram 700 of a device 705 that supports techniques for demodulation reference signal bundling for configured uplink channels in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for demodulation reference signal bundling for configured uplink channels). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for demodulation reference signal bundling for configured uplink channels). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of techniques for demodulation reference signal bundling for configured uplink channels as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a UE in accordance with examples as disclosed herein. For example, the communications manager 720 may be configured as or otherwise support a means for receiving, from a base station, control signaling including a configured grant scheduling a first uplink channel during a first time slot, the first time slot different from a second time slot scheduled for transmission of a second uplink channel. The communications manager 720 may be configured as or otherwise support a means for generating dummy data for the first uplink channel based on information associated with the configured grant failing to satisfy a transmission criterion. The communications manager 720 may be configured as or otherwise support a means for transmitting, to the base station, the dummy data and a first set of multiple demodulation reference signals in the first uplink channel during the first time slot and a second set of multiple demodulation reference signals in the second uplink channel during the second time slot, the first set of multiple demodulation reference signals and the second set of multiple demodulation reference signals having phase continuity.

Additionally, or alternatively, the communications manager 720 may support wireless communications a UE in accordance with examples as disclosed herein. For example, the communications manager 720 may be configured as or otherwise support a means for receiving, from a base station, control signaling instructing the UE to maintain phase continuity between a first set of multiple demodulation reference signals in a first uplink channel and a second set of multiple demodulation reference signals in a second uplink channel. The communications manager 720 may be configured as or otherwise support a means for receiving, from the base station, control signaling including a configured grant scheduling the first uplink channel during a first time slot, the first time slot different from a second time slot scheduled for transmission of the second uplink channel. The communications manager 720 may be configured as or otherwise support a means for suppressing a transmission of the first uplink channel during the first time slot based on information associated with the configured grant failing to satisfy a transmission criterion. The communications manager 720 may be configured as or otherwise support a means for transmitting, to the base station, the second uplink channel and the second set of multiple demodulation reference signals associated with at least the second uplink channel, the second set of multiple demodulation reference signals of the second uplink channel failing to maintain the phase continuity with the first set of multiple demodulation reference signals based on the suppressing.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for DMRS bundling for configured uplink channels resulting in more efficient use of resources, more robust demodulation (e.g., resulting from joint channel estimation), more accurate decoding, decreased retransmissions of data messages, and decreased latency.

Figure 8:
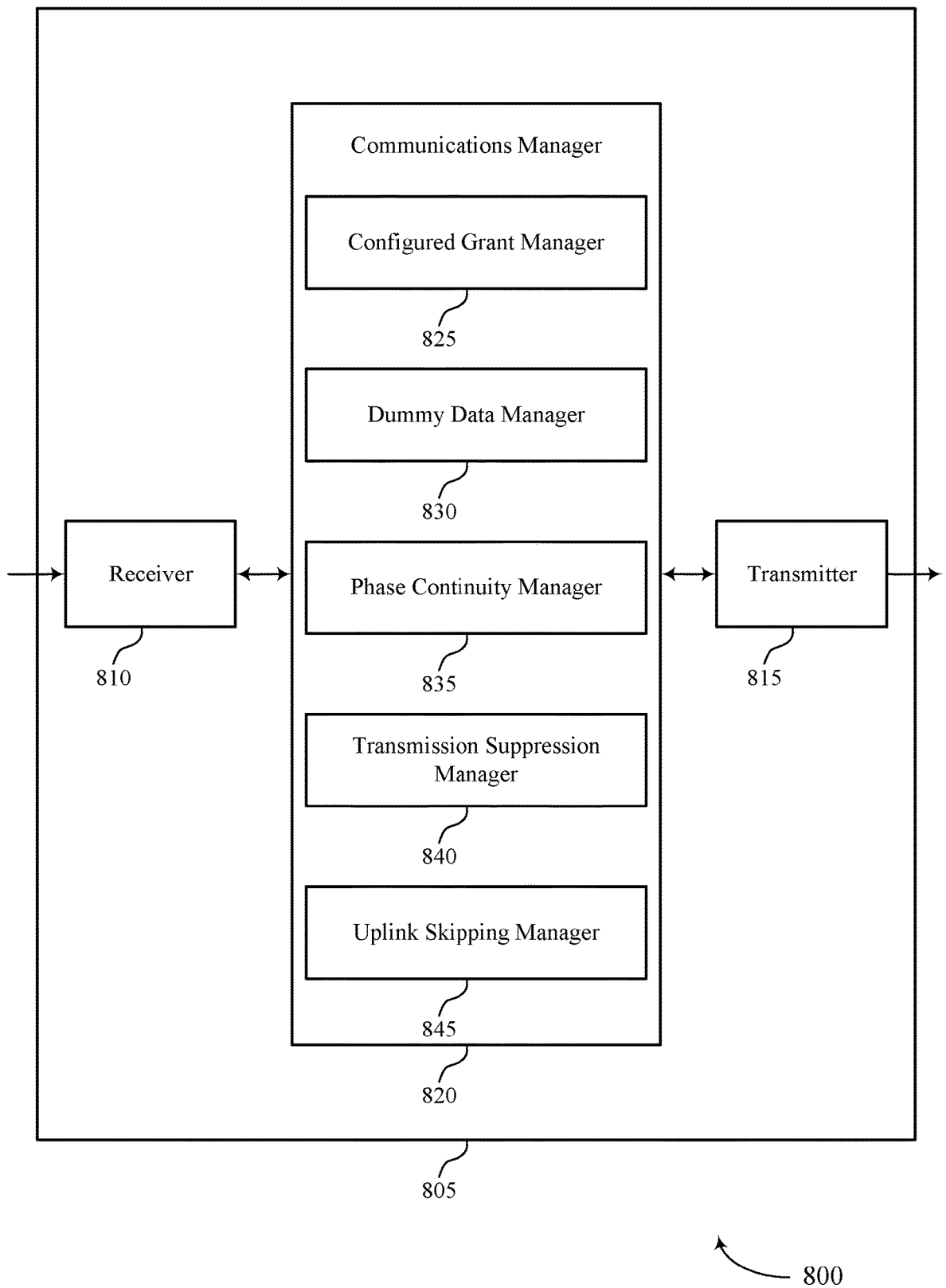

FIG. 8 shows a block diagram 800 of a device 805 that supports techniques for demodulation reference signal bundling for configured uplink channels in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for demodulation reference signal bundling for configured uplink channels). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for demodulation reference signal bundling for configured uplink channels). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of techniques for demodulation reference signal bundling for configured uplink channels as described herein. For example, the communications manager 820 may include a configured grant manager 825, a dummy data manager 830, a phase continuity manager 835, a transmission suppression manager 840, an uplink skipping manager 845, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a UE in accordance with examples as disclosed herein. The configured grant manager 825 may be configured as or otherwise support a means for receiving, from a base station, control signaling including a configured grant scheduling a first uplink channel during a first time slot, the first time slot different from a second time slot scheduled for transmission of a second uplink channel. The dummy data manager 830 may be configured as or otherwise support a means for generating dummy data for the first uplink channel based on information associated with the configured grant failing to satisfy a transmission criterion. The phase continuity manager 835 may be configured as or otherwise support a means for transmitting, to the base station, the dummy data and a first set of multiple demodulation reference signals in the first uplink channel during the first time slot and a second set of multiple demodulation reference signals in the second uplink channel during the second time slot, the first set of multiple demodulation reference signals and the second set of multiple demodulation reference signals having phase continuity.

Additionally, or alternatively, the communications manager 820 may support wireless communications a UE in accordance with examples as disclosed herein. The phase continuity manager 835 may be configured as or otherwise support a means for receiving, from a base station, control signaling instructing the UE to maintain phase continuity between a first set of multiple demodulation reference signals in a first uplink channel and a second set of multiple demodulation reference signals in a second uplink channel. The configured grant manager 825 may be configured as or otherwise support a means for receiving, from the base station, control signaling including a configured grant scheduling the first uplink channel during a first time slot, the first time slot different from a second time slot scheduled for transmission of the second uplink channel. The transmission suppression manager 840 may be configured as or otherwise support a means for suppressing a transmission of the first uplink channel during the first time slot based on information associated with the configured grant failing to satisfy a transmission criterion. The uplink skipping manager 845 may be configured as or otherwise support a means for transmitting, to the base station, the second uplink channel and the second set of multiple demodulation reference signals associated with at least the second uplink channel, the second set of multiple demodulation reference signals of the second uplink channel failing to maintain the phase continuity with the first set of multiple demodulation reference signals based on the suppressing.

Figure 9:
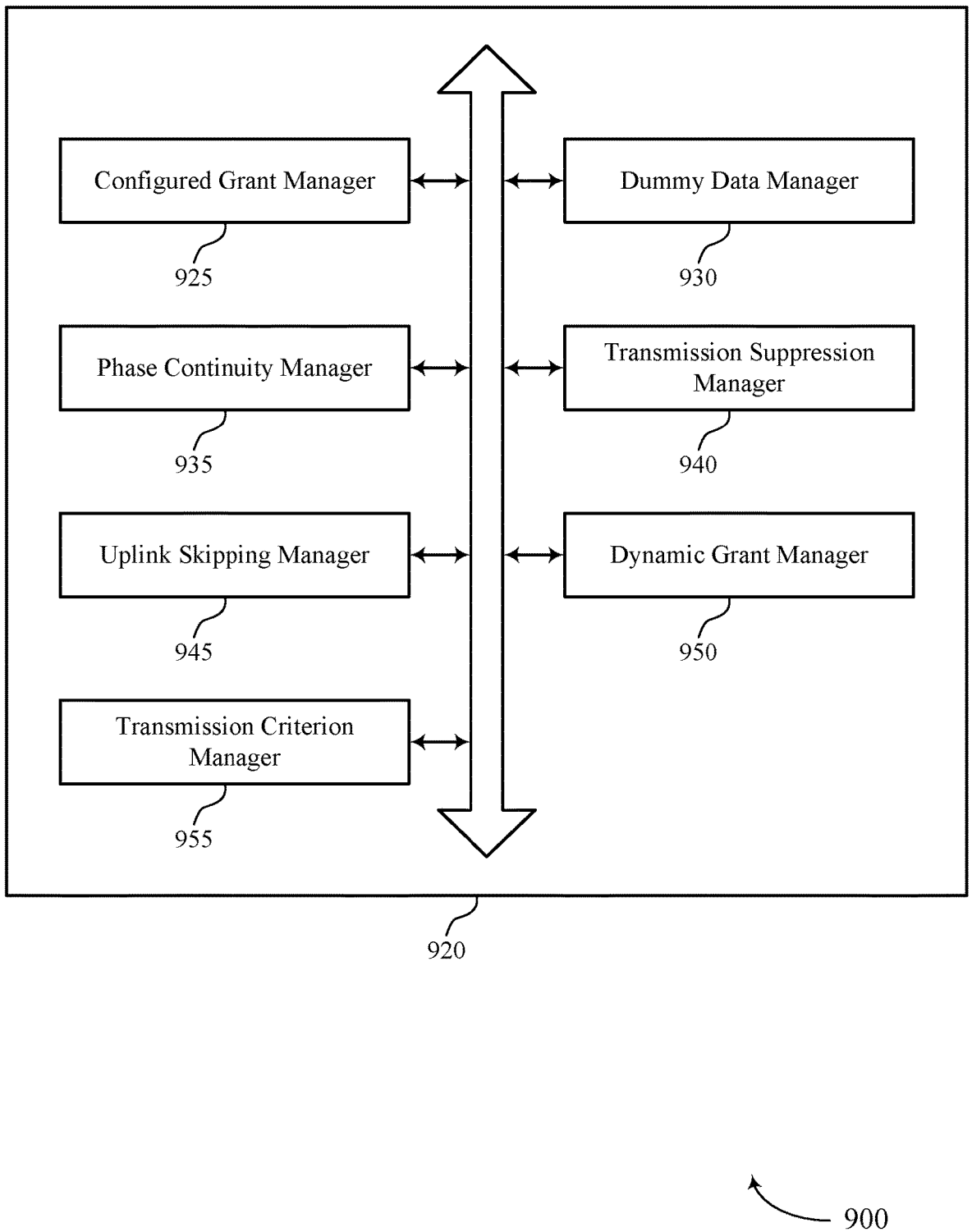
FIG. 9 shows a block diagram of a communications manager that supports techniques for demodulation reference signal bundling for configured uplink channels in accordance with aspects of the present disclosure.

FIG. 9 shows a block diagram 900 of a communications manager 920 that supports techniques for demodulation reference signal bundling for configured uplink channels in accordance with aspects of the present disclosure. The communications manager 920 may be an example of aspects of a communications manager 720, a communications manager 820, or both, as described herein. The communications manager 920, or various components thereof, may be an example of means for performing various aspects of techniques for demodulation reference signal bundling for configured uplink channels as described herein. For example, the communications manager 920 may include a configured grant manager 925, a dummy data manager 930, a phase continuity manager 935, a transmission suppression manager 940, an uplink skipping manager 945, a dynamic grant manager 950, a transmission criterion manager 955, or any combination thereof. Each of these components may communicate, directly or indirectly, with one another (e.g., via one or more buses).

The communications manager 920 may support wireless communications at a UE in accordance with examples as disclosed herein. The configured grant manager 925 may be configured as or otherwise support a means for receiving, from a base station, control signaling including a configured grant scheduling a first uplink channel during a first time slot, the first time slot different from a second time slot scheduled for transmission of a second uplink channel. The dummy data manager 930 may be configured as or otherwise support a means for generating dummy data for the first uplink channel based on information associated with the configured grant failing to satisfy a transmission criterion. The phase continuity manager 935 may be configured as or otherwise support a means for transmitting, to the base station, the dummy data and a first set of multiple demodulation reference signals in the first uplink channel during the first time slot and a second set of multiple demodulation reference signals in the second uplink channel during the second time slot, the first set of multiple demodulation reference signals and the second set of multiple demodulation reference signals having phase continuity.

In some examples, the phase continuity manager 935 may be configured as or otherwise support a means for receiving, from the base station, control signaling instructing the UE to maintain the phase continuity across a set of multiple uplink channels including a first uplink channel and the second uplink channel.

In some examples, generating the dummy data for the first uplink channel is based on receiving the control signaling instructing the UE to maintain the phase continuity across the set of multiple uplink channels.

In some examples, the dynamic grant manager 950 may be configured as or otherwise support a means for receiving, from the base station, a downlink control information message including a dynamic grant scheduling the second uplink channel during the second time slot, where transmitting the second set of multiple demodulation reference signals in the second uplink channel is based on receiving the dynamic grant.

In some examples, the configured grant manager 925 may be configured as or otherwise support a means for receiving, from the base station, control signaling including a second configured grant scheduling the second uplink channel during the second time slot, where transmitting the second set of multiple demodulation reference signals in the second uplink channel is based on receiving the second configured grant.

In some examples, the transmission criterion manager 955 may be configured as or otherwise support a means for determining that a quantity of data in a buffer for transmission to the base station failing to satisfy a threshold, where the configured grant failing to satisfy the transmission criterion and transmitting the dummy data is based on the determining.

In some examples, one or more of parameters used to maintain the phase continuity includes a phase value of the first uplink channel and the second uplink channel, a radio frequency band used by the first uplink channel and the second uplink channel, a resource block used by the first uplink channel and the second uplink channel, a transmission power of the first uplink channel and the second uplink channel, one or more antenna ports used for transmitting the first set of multiple demodulation reference signals and the second set of multiple demodulation reference signals, a precoding scheme of the first uplink channel and the second uplink channel, or any combination thereof.

In some examples, the phase continuity manager 935 may be configured as or otherwise support a means for maintaining the phase continuity across the first time slot and the second time slot using a demodulation reference signal bundling procedure that supports joint channel estimation at the base station, where the transmitting is based on maintaining the phase continuity.

In some examples, the first uplink channel includes a physical uplink shared channel. In some examples, the second uplink channel includes a physical uplink shared channel.

Additionally, or alternatively, the communications manager 920 may support wireless communications a UE in accordance with examples as disclosed herein. In some examples, the phase continuity manager 935 may be configured as or otherwise support a means for receiving, from a base station, control signaling instructing the UE to maintain phase continuity between a first set of multiple demodulation reference signals in a first uplink channel and a second set of multiple demodulation reference signals in a second uplink channel. In some examples, the configured grant manager 925 may be configured as or otherwise support a means for receiving, from the base station, control signaling including a configured grant scheduling the first uplink channel during a first time slot, the first time slot different from a second time slot scheduled for transmission of the second uplink channel. The transmission suppression manager 940 may be configured as or otherwise support a means for suppressing a transmission of the first uplink channel during the first time slot based on information associated with the configured grant failing to satisfy a transmission criterion. The uplink skipping manager 945 may be configured as or otherwise support a means for transmitting, to the base station, the second uplink channel and the second set of multiple demodulation reference signals associated with at least the second uplink channel, the second set of multiple demodulation reference signals of the second uplink channel failing to maintain the phase continuity with the first set of multiple demodulation reference signals based on the suppressing.

In some examples, the dynamic grant manager 950 may be configured as or otherwise support a means for receiving, from the base station, a downlink control information message including a dynamic grant scheduling the second uplink channel during the second time slot, where transmitting the second set of multiple demodulation reference signals in the second uplink channel is based on receiving the dynamic grant.

In some examples, the configured grant manager 925 may be configured as or otherwise support a means for transmitting, to the UE, control signaling including a second configured grant scheduling the second uplink channel during the second time slot, where transmitting the second set of multiple demodulation reference signals in the second uplink channel is based on receiving the configured grant.

In some examples, the transmission criterion manager 955 may be configured as or otherwise support a means for determining that a quantity of data in a buffer for transmission to the base station failing to satisfy a threshold, where the configured grant failing to satisfy the transmission criterion and transmitting the dummy data is based on the determining.

In some examples, the phase continuity manager 935 may be configured as or otherwise support a means for selecting, based on the suppressing, a first set of parameters for transmitting the first set of multiple demodulation reference signals. In some examples, the phase continuity manager 935 may be configured as or otherwise support a means for selecting, based on the suppressing, a second set of parameters for transmitting the second set of multiple demodulation reference signals, where the second set of parameter values are different from the first set of parameter values.

In some examples, the first set of parameters includes a phase value of the first uplink channel, a radio frequency band used by the first uplink channel, a transmission power of the first uplink channel, one or more antenna ports used for transmitting the first set of multiple demodulation reference signals, a precoding scheme of the first uplink channel, or any combination thereof. In some examples, the second set of parameters includes a phase value of the second uplink channel, a radio frequency band used by the second uplink channel, a transmission power of the second uplink channel, one or more antenna ports used for transmitting the second set of multiple demodulation reference signals, a precoding scheme of the second uplink channel, or any combination thereof.

In some examples, the first uplink channel includes a physical uplink shared channel. In some examples, the second uplink channel includes a physical uplink shared channel.

Figure 10:
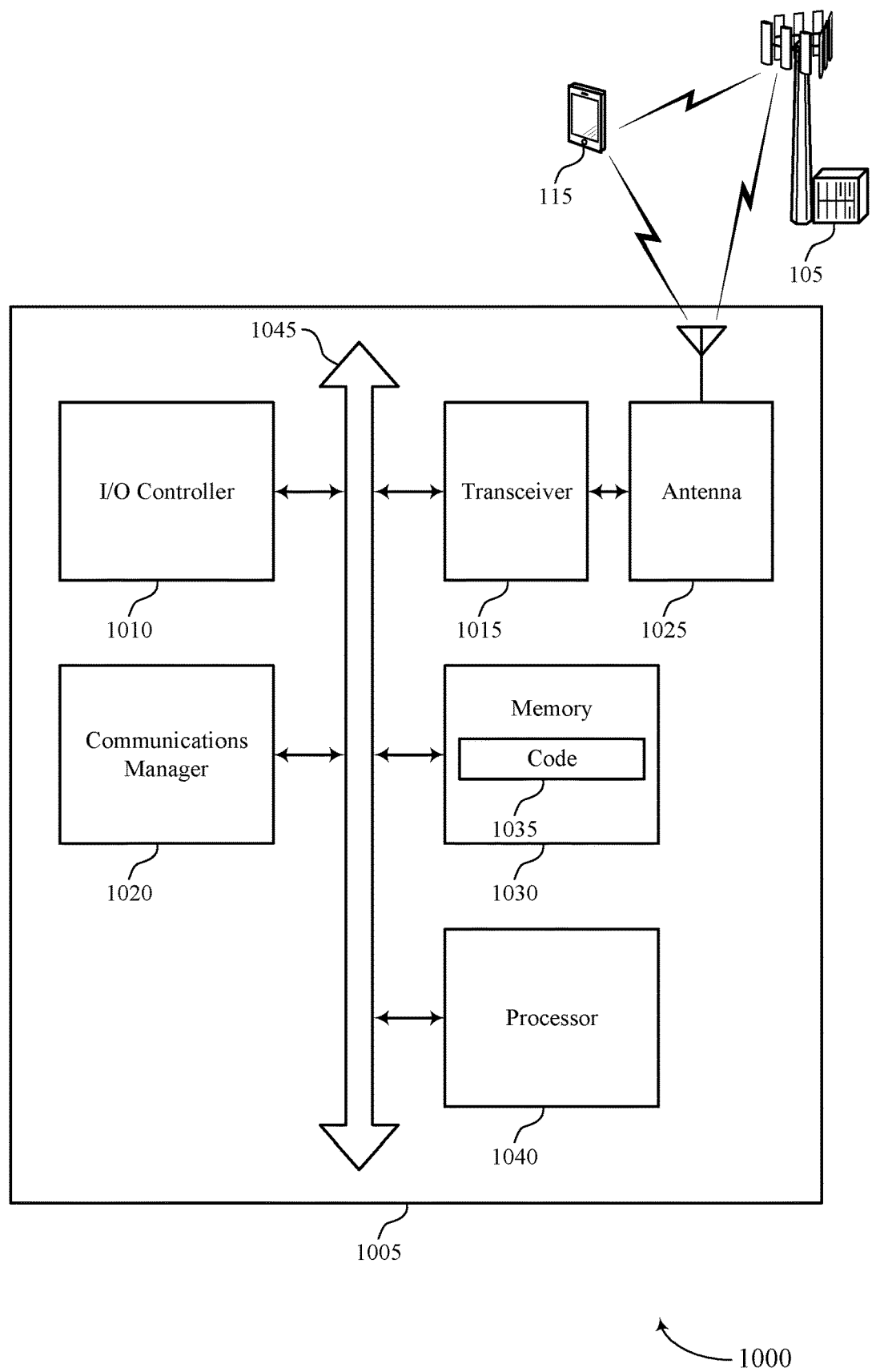
FIG. 10 shows a diagram of a system including a device that supports techniques for demodulation reference signal bundling for configured uplink channels in accordance with aspects of the present disclosure.

FIG. 10 shows a diagram of a system 1000 including a device 1005 that supports techniques for demodulation reference signal bundling for configured uplink channels in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting techniques for demodulation reference signal bundling for configured uplink channels). For example, the device 1005 or a component of the device 1005 may include a processor 1040 and memory 1030 coupled to the processor 1040, the processor 1040 and memory 1030 configured to perform various functions described herein.

The communications manager 1020 may support wireless communications at a UE in accordance with examples as disclosed herein. For example, the communications manager 1020 may be configured as or otherwise support a means for receiving, from a base station, control signaling including a configured grant scheduling a first uplink channel during a first time slot, the first time slot different from a second time slot scheduled for transmission of a second uplink channel. The communications manager 1020 may be configured as or otherwise support a means for generating dummy data for the first uplink channel based on information associated with the configured grant failing to satisfy a transmission criterion. The communications manager 1020 may be configured as or otherwise support a means for transmitting, to the base station, the dummy data and a first set of multiple demodulation reference signals in the first uplink channel during the first time slot and a second set of multiple demodulation reference signals in the second uplink channel during the second time slot, the first set of multiple demodulation reference signals and the second set of multiple demodulation reference signals having phase continuity.

Additionally, or alternatively, the communications manager 1020 may support wireless communications a UE in accordance with examples as disclosed herein. For example, the communications manager 1020 may be configured as or otherwise support a means for receiving, from a base station, control signaling instructing the UE to maintain phase continuity between a first set of multiple demodulation reference signals in a first uplink channel and a second set of multiple demodulation reference signals in a second uplink channel. The communications manager 1020 may be configured as or otherwise support a means for receiving, from the base station, control signaling including a configured grant scheduling the first uplink channel during a first time slot, the first time slot different from a second time slot scheduled for transmission of the second uplink channel. The communications manager 1020 may be configured as or otherwise support a means for suppressing a transmission of the first uplink channel during the first time slot based on information associated with the configured grant failing to satisfy a transmission criterion. The communications manager 1020 may be configured as or otherwise support a means for transmitting, to the base station, the second uplink channel and the second set of multiple demodulation reference signals associated with at least the second uplink channel, the second set of multiple demodulation reference signals of the second uplink channel failing to maintain the phase continuity with the first set of multiple demodulation reference signals based on the suppressing.

By including or configuring the communications manager 1020 in accordance with examples as described herein, the device 1005 may support techniques for DMRS bundling for configured uplink channels resulting in more efficient use of resources, more robust demodulation (e.g., resulting from joint channel estimation), more accurate decoding, decreased retransmissions of data messages, and decreased latency.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of techniques for demodulation reference signal bundling for configured uplink channels as described herein, or the processor 1040 and the memory 1030 may be otherwise configured to perform or support such operations.

Figure 11:
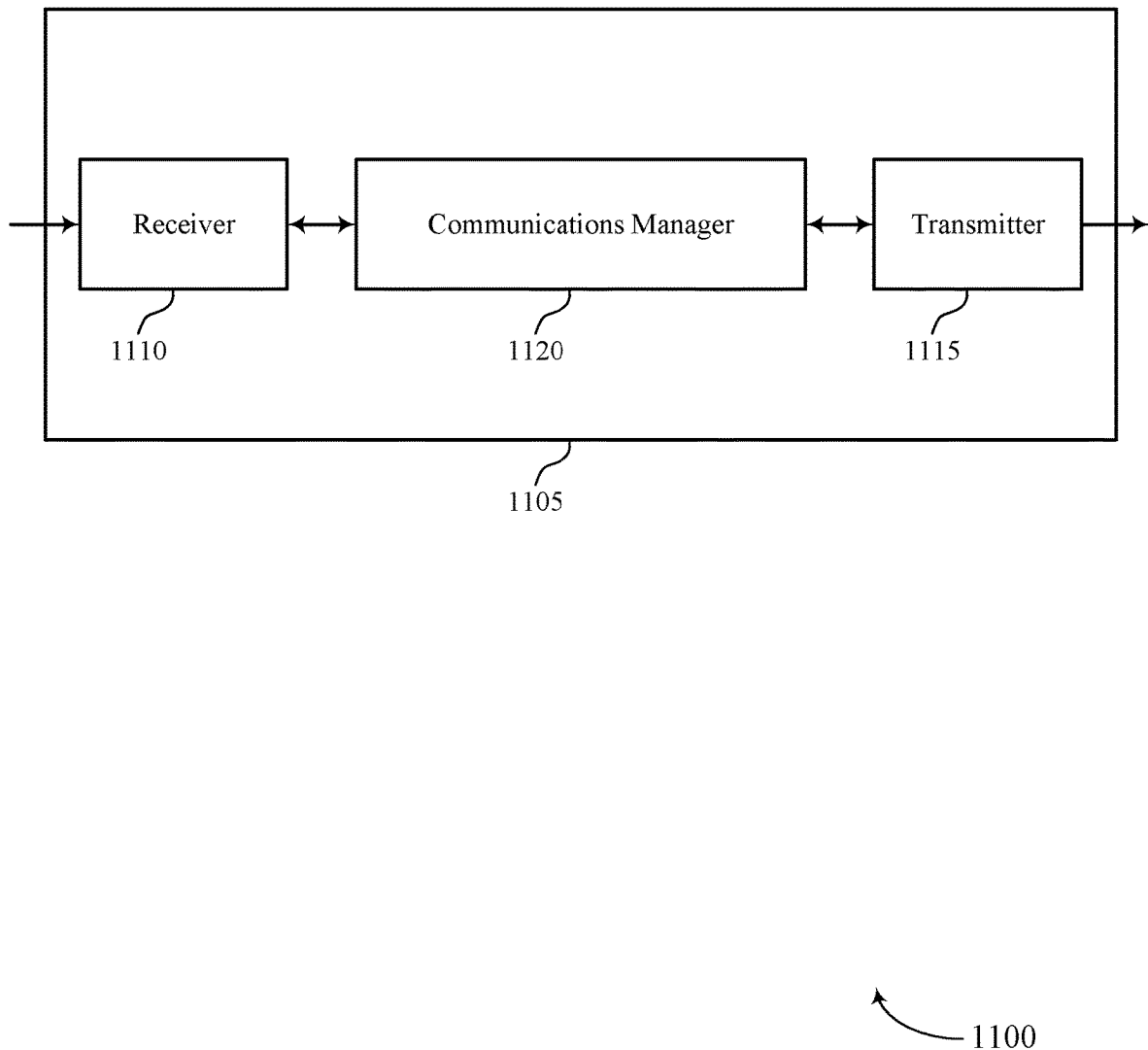
FIGS. 11 and 12 show block diagrams of devices that support techniques for demodulation reference signal bundling for configured uplink channels in accordance with aspects of the present disclosure.

FIG. 11 shows a block diagram 1100 of a device 1105 that supports techniques for demodulation reference signal bundling for configured uplink channels in accordance with aspects of the present disclosure. The device 1105 may be an example of aspects of a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to techniques for demodulation reference signal bundling for configured uplink channels). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to techniques for demodulation reference signal bundling for configured uplink channels). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of techniques for demodulation reference signal bundling for configured uplink channels as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a base station in accordance with examples as disclosed herein. For example, the communications manager 1120 may be configured as or otherwise support a means for transmitting, to a UE, control signaling including a configured grant scheduling a first uplink channel during a first time slot, the first time slot different from a second time slot scheduled for transmission of a second uplink channel. The communications manager 1120 may be configured as or otherwise support a means for receiving, from the UE based on the configured grant, dummy data and a first set of multiple demodulation reference signals in the first uplink channel during the first time slot and a second set of multiple demodulation reference signals in the second uplink channel during the second time slot, the first set of multiple demodulation reference signals and the second set of multiple demodulation reference signals having phase continuity. The communications manager 1120 may be configured as or otherwise support a means for performing channel estimation for at least the second uplink channel based on the first set of multiple demodulation reference signals and the second uplink channel having phase continuity. The communications manager 1120 may be configured as or otherwise support a means for decoding the second uplink channel based on the channel estimation.

Additionally, or alternatively, the communications manager 1120 may support wireless communications at a base station in accordance with examples as disclosed herein. For example, the communications manager 1120 may be configured as or otherwise support a means for transmitting, to a UE, control signaling instructing the UE to maintain phase continuity between a first set of multiple demodulation reference signals in a first uplink channel and a second set of multiple demodulation reference signals in a second uplink channel. The communications manager 1120 may be configured as or otherwise support a means for transmitting, to the UE, control signaling including a configured grant scheduling the first uplink channel during a first time slot, the first time slot different from a second time slot scheduled for transmission of the second uplink channel. The communications manager 1120 may be configured as or otherwise support a means for monitoring for the first uplink channel during the first time slot and the second uplink channel during the second time slot. The communications manager 1120 may be configured as or otherwise support a means for receiving, from the UE based on the monitoring, the second uplink channel and the second set of multiple demodulation reference signals associated with at least the second uplink channel, the second set of multiple demodulation reference signals of the second uplink channel failing to maintain the phase continuity with the first set of multiple demodulation reference signals.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for DMRS bundling for configured uplink channels resulting in more efficient use of resources, more robust demodulation (e.g., resulting from joint channel estimation), more accurate decoding, decreased retransmissions of data messages, and decreased latency.

Figure 12:
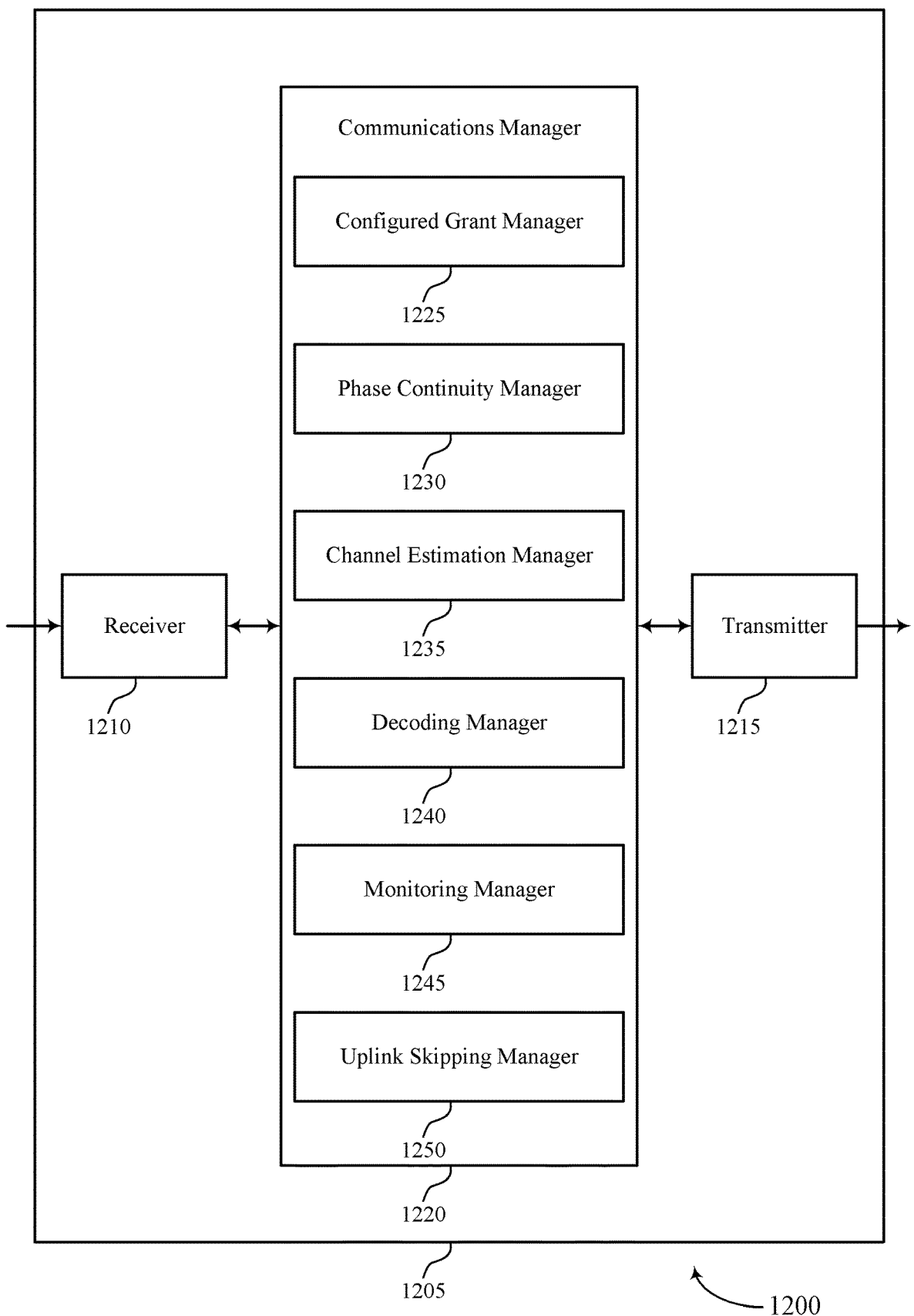

FIG. 12 shows a block diagram 1200 of a device 1205 that supports techniques for demodulation reference signal bundling for configured uplink channels in accordance with aspects of the present disclosure. The device 1205 may be an example of aspects of a device 1105 or a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to techniques for demodulation reference signal bundling for configured uplink channels). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to techniques for demodulation reference signal bundling for configured uplink channels). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of techniques for demodulation reference signal bundling for configured uplink channels as described herein. For example, the communications manager 1220 may include a configured grant manager 1225, a phase continuity manager 1230, a channel estimation manager 1235, a decoding manager 1240, a monitoring manager 1245, an uplink skipping manager 1250, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communications at a base station in accordance with examples as disclosed herein. The configured grant manager 1225 may be configured as or otherwise support a means for transmitting, to a UE, control signaling including a configured grant scheduling a first uplink channel during a first time slot, the first time slot different from a second time slot scheduled for transmission of a second uplink channel. The phase continuity manager 1230 may be configured as or otherwise support a means for receiving, from the UE based on the configured grant, dummy data and a first set of multiple demodulation reference signals in the first uplink channel during the first time slot and a second set of multiple demodulation reference signals in the second uplink channel during the second time slot, the first set of multiple demodulation reference signals and the second set of multiple demodulation reference signals having phase continuity. The channel estimation manager 1235 may be configured as or otherwise support a means for performing channel estimation for at least the second uplink channel based on the first set of multiple demodulation reference signals and the second uplink channel having phase continuity. The decoding manager 1240 may be configured as or otherwise support a means for decoding the second uplink channel based on the channel estimation.

Additionally, or alternatively, the communications manager 1220 may support wireless communications at a base station in accordance with examples as disclosed herein. The phase continuity manager 1230 may be configured as or otherwise support a means for transmitting, to a UE, control signaling instructing the UE to maintain phase continuity between a first set of multiple demodulation reference signals in a first uplink channel and a second set of multiple demodulation reference signals in a second uplink channel. The configured grant manager 1225 may be configured as or otherwise support a means for transmitting, to the UE, control signaling including a configured grant scheduling the first uplink channel during a first time slot, the first time slot different from a second time slot scheduled for transmission of the second uplink channel. The monitoring manager 1245 may be configured as or otherwise support a means for monitoring for the first uplink channel during the first time slot and the second uplink channel during the second time slot. The uplink skipping manager 1250 may be configured as or otherwise support a means for receiving, from the UE based on the monitoring, the second uplink channel and the second set of multiple demodulation reference signals associated with at least the second uplink channel, the second set of multiple demodulation reference signals of the second uplink channel failing to maintain the phase continuity with the first set of multiple demodulation reference signals.

Figure 13:
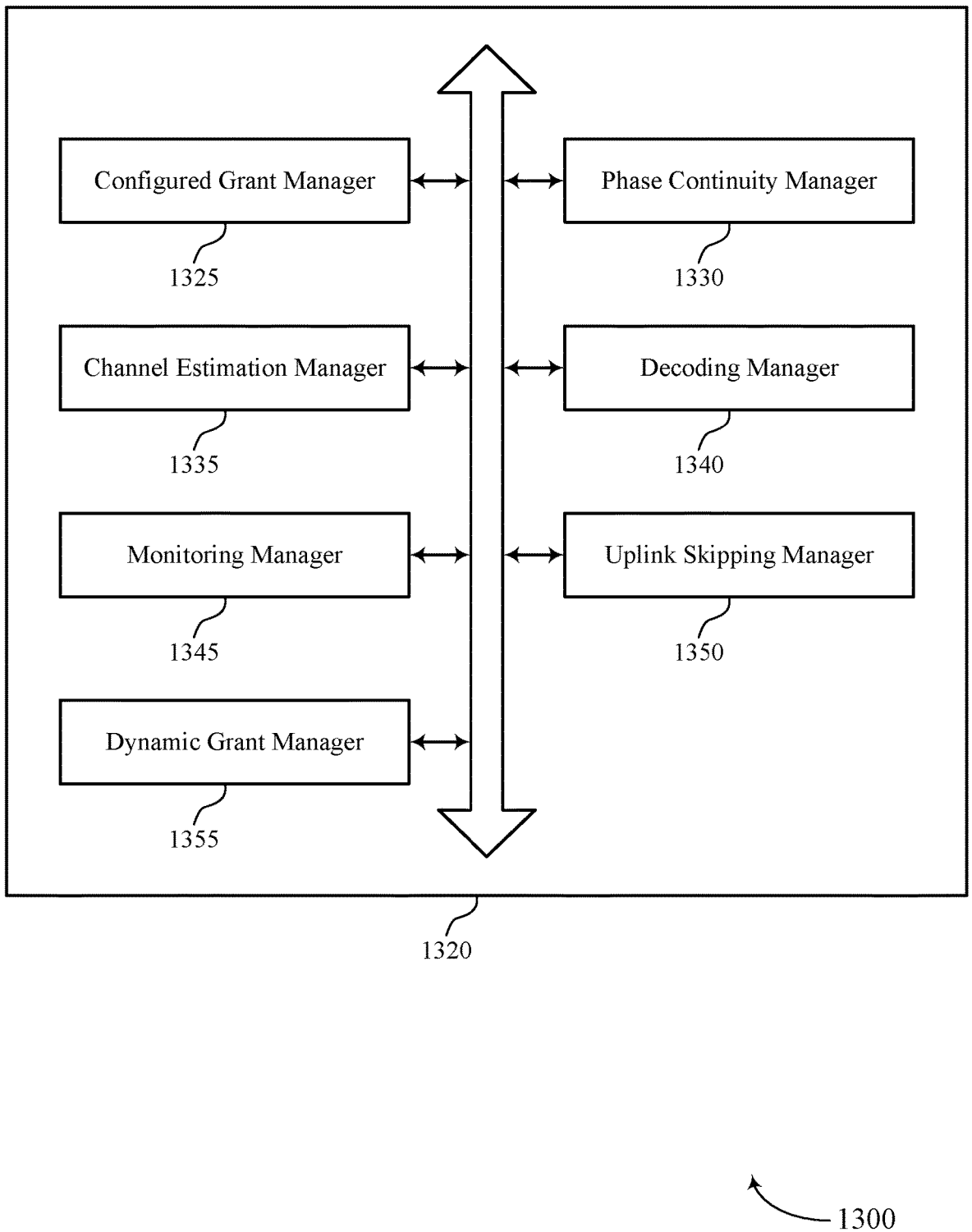
FIG. 13 shows a block diagram of a communications manager that supports techniques for demodulation reference signal bundling for configured uplink channels in accordance with aspects of the present disclosure.

FIG. 13 shows a block diagram 1300 of a communications manager 1320 that supports techniques for demodulation reference signal bundling for configured uplink channels in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of techniques for demodulation reference signal bundling for configured uplink channels as described herein. For example, the communications manager 1320 may include a configured grant manager 1325, a phase continuity manager 1330, a channel estimation manager 1335, a decoding manager 1340, a monitoring manager 1345, an uplink skipping manager 1350, a dynamic grant manager 1355, or any combination thereof. Each of these components may communicate, directly or indirectly, with one another (e.g., via one or more buses).

The communications manager 1320 may support wireless communications at a base station in accordance with examples as disclosed herein. The configured grant manager 1325 may be configured as or otherwise support a means for transmitting, to a UE, control signaling including a configured grant scheduling a first uplink channel during a first time slot, the first time slot different from a second time slot scheduled for transmission of a second uplink channel. The phase continuity manager 1330 may be configured as or otherwise support a means for receiving, from the UE based on the configured grant, dummy data and a first set of multiple demodulation reference signals in the first uplink channel during the first time slot and a second set of multiple demodulation reference signals in the second uplink channel during the second time slot, the first set of multiple demodulation reference signals and the second set of multiple demodulation reference signals having phase continuity. The channel estimation manager 1335 may be configured as or otherwise support a means for performing channel estimation for at least the second uplink channel based on the first set of multiple demodulation reference signals and the second uplink channel having phase continuity. The decoding manager 1340 may be configured as or otherwise support a means for decoding the second uplink channel based on the channel estimation.

In some examples, the phase continuity manager 1330 may be configured as or otherwise support a means for transmitting, to the UE, control signaling instructing the UE to maintain the phase continuity across a set of multiple uplink channels including a first uplink channel and the second uplink channel.

In some examples, receiving the dummy data in the first uplink channel is based on transmitting the control signaling instructing the UE to maintain the phase continuity across the set of multiple uplink channels.

In some examples, the dynamic grant manager 1355 may be configured as or otherwise support a means for transmitting, to the UE, a downlink control information message including a dynamic grant scheduling the second uplink channel during the second time slot, where receiving the second set of multiple demodulation reference signals in the second uplink channel is based on transmitting the dynamic grant.

In some examples, the configured grant manager 1325 may be configured as or otherwise support a means for transmitting, to the UE, control signaling including a second configured grant scheduling the second uplink channel during the second time slot, where receiving the second set of multiple demodulation reference signals in the second uplink channel is based on transmitting the second configured grant.

In some examples, receiving the dummy data is based on the configured grant failing to satisfy a transmission criterion for the UE.

In some examples, one or more parameters used to receive the first set of multiple demodulation reference signals and the second set of multiple demodulation reference signals having the phase continuity includes a phase value of the first uplink channel and the second uplink channel, a radio frequency band used by the first uplink channel and the second uplink channel, a resource block used by the first uplink channel and the second uplink channel, a transmission power of the first uplink channel and the second uplink channel, one or more antenna ports used for receiving the first set of multiple demodulation reference signals and the second set of multiple demodulation reference signals, a precoding scheme of the first uplink channel and the second uplink channel, or any combination thereof.

In some examples, the first uplink channel includes a physical uplink shared channel. In some examples, the second uplink channel includes a physical uplink shared channel.

Additionally, or alternatively, the communications manager 1320 may support wireless communications at a base station in accordance with examples as disclosed herein. In some examples, the phase continuity manager 1330 may be configured as or otherwise support a means for transmitting, to a UE, control signaling instructing the UE to maintain phase continuity between a first set of multiple demodulation reference signals in a first uplink channel and a second set of multiple demodulation reference signals in a second uplink channel. In some examples, the configured grant manager 1325 may be configured as or otherwise support a means for transmitting, to the UE, control signaling including a configured grant scheduling the first uplink channel during a first time slot, the first time slot different from a second time slot scheduled for transmission of the second uplink channel. The monitoring manager 1345 may be configured as or otherwise support a means for monitoring for the first uplink channel during the first time slot and the second uplink channel during the second time slot. The uplink skipping manager 1350 may be configured as or otherwise support a means for receiving, from the UE based on the monitoring, the second uplink channel and the second set of multiple demodulation reference signals associated with at least the second uplink channel, the second set of multiple demodulation reference signals of the second uplink channel failing to maintain the phase continuity with the first set of multiple demodulation reference signals.

In some examples, the dynamic grant manager 1355 may be configured as or otherwise support a means for transmitting, to the UE, a downlink control information message including a dynamic grant scheduling the second uplink channel during the second time slot, where receiving the second set of multiple demodulation reference signals in the second uplink channel is based on transmitting the dynamic grant.

In some examples, the configured grant manager 1325 may be configured as or otherwise support a means for transmitting, to the UE, control signaling including a second configured grant scheduling the second uplink channel during the second time slot, where receiving the second set of multiple demodulation reference signals in the second uplink channel is based on transmitting the configured grant.

In some examples, the channel estimation manager 1335 may be configured as or otherwise support a means for refraining from performing a channel estimation for the first uplink channel and the second uplink channel based on failing to receive the first uplink channel and the second set of multiple demodulation reference signals failing to maintain the phase continuity with the first set of multiple demodulation reference signals.

In some examples, the phase continuity manager 1330 may be configured as or otherwise support a means for receiving the first set of multiple demodulation reference signals according to a first set of parameters based on the monitoring and the first set of multiple demodulation reference signals failing to maintain phase continuity with the first set of multiple demodulation reference signals. In some examples, the phase continuity manager 1330 may be configured as or otherwise support a means for receiving the second set of multiple demodulation reference signals according to a second set of parameters based on the monitoring and the second set of multiple demodulation reference signals failing to maintain phase continuity with the first set of multiple demodulation reference signals.

In some examples, the first uplink channel includes a physical uplink shared channel. In some examples, the second uplink channel includes a physical uplink shared channel.

Figure 14:
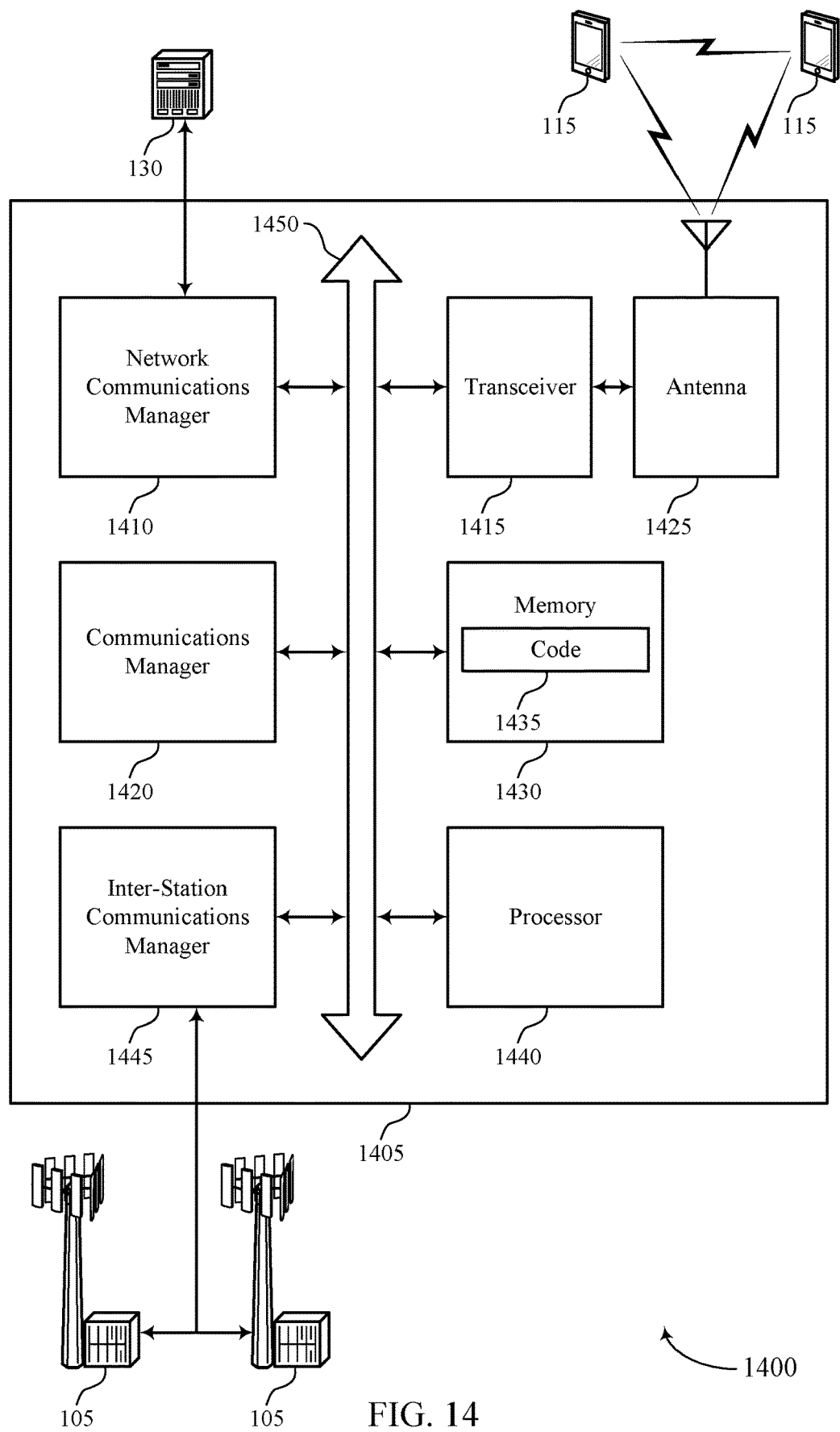
FIG. 14 shows a diagram of a system including a device that supports techniques for demodulation reference signal bundling for configured uplink channels in accordance with aspects of the present disclosure.

FIG. 14 shows a diagram of a system 1400 including a device 1405 that supports techniques for demodulation reference signal bundling for configured uplink channels in accordance with aspects of the present disclosure. The device 1405 may be an example of or include the components of a device 1105, a device 1205, or a base station 105 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting techniques for demodulation reference signal bundling for configured uplink channels). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other base stations 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The communications manager 1420 may support wireless communications at a base station in accordance with examples as disclosed herein. For example, the communications manager 1420 may be configured as or otherwise support a means for transmitting, to a UE, control signaling including a configured grant scheduling a first uplink channel during a first time slot, the first time slot different from a second time slot scheduled for transmission of a second uplink channel. The communications manager 1420 may be configured as or otherwise support a means for receiving, from the UE based on the configured grant, dummy data and a first set of multiple demodulation reference signals in the first uplink channel during the first time slot and a second set of multiple demodulation reference signals in the second uplink channel during the second time slot, the first set of multiple demodulation reference signals and the second set of multiple demodulation reference signals having phase continuity. The communications manager 1420 may be configured as or otherwise support a means for performing channel estimation for at least the second uplink channel based on the first set of multiple demodulation reference signals and the second uplink channel having phase continuity. The communications manager 1420 may be configured as or otherwise support a means for decoding the second uplink channel based on the channel estimation.

Additionally, or alternatively, the communications manager 1420 may support wireless communications at a base station in accordance with examples as disclosed herein. For example, the communications manager 1420 may be configured as or otherwise support a means for transmitting, to a UE, control signaling instructing the UE to maintain phase continuity between a first set of multiple demodulation reference signals in a first uplink channel and a second set of multiple demodulation reference signals in a second uplink channel. The communications manager 1420 may be configured as or otherwise support a means for transmitting, to the UE, control signaling including a configured grant scheduling the first uplink channel during a first time slot, the first time slot different from a second time slot scheduled for transmission of the second uplink channel. The communications manager 1420 may be configured as or otherwise support a means for monitoring for the first uplink channel during the first time slot and the second uplink channel during the second time slot. The communications manager 1420 may be configured as or otherwise support a means for receiving, from the UE based on the monitoring, the second uplink channel and the second set of multiple demodulation reference signals associated with at least the second uplink channel, the second set of multiple demodulation reference signals of the second uplink channel failing to maintain the phase continuity with the first set of multiple demodulation reference signals.

By including or configuring the communications manager 1420 in accordance with examples as described herein, the device 1405 may support techniques for DMRS bundling for configured uplink channels resulting in more efficient use of resources, more robust demodulation (e.g., resulting from joint channel estimation), more accurate decoding, decreased retransmissions of data messages, and decreased latency.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of techniques for demodulation reference signal bundling for configured uplink channels as described herein, or the processor 1440 and the memory 1430 may be otherwise configured to perform or support such operations.

Figure 15:
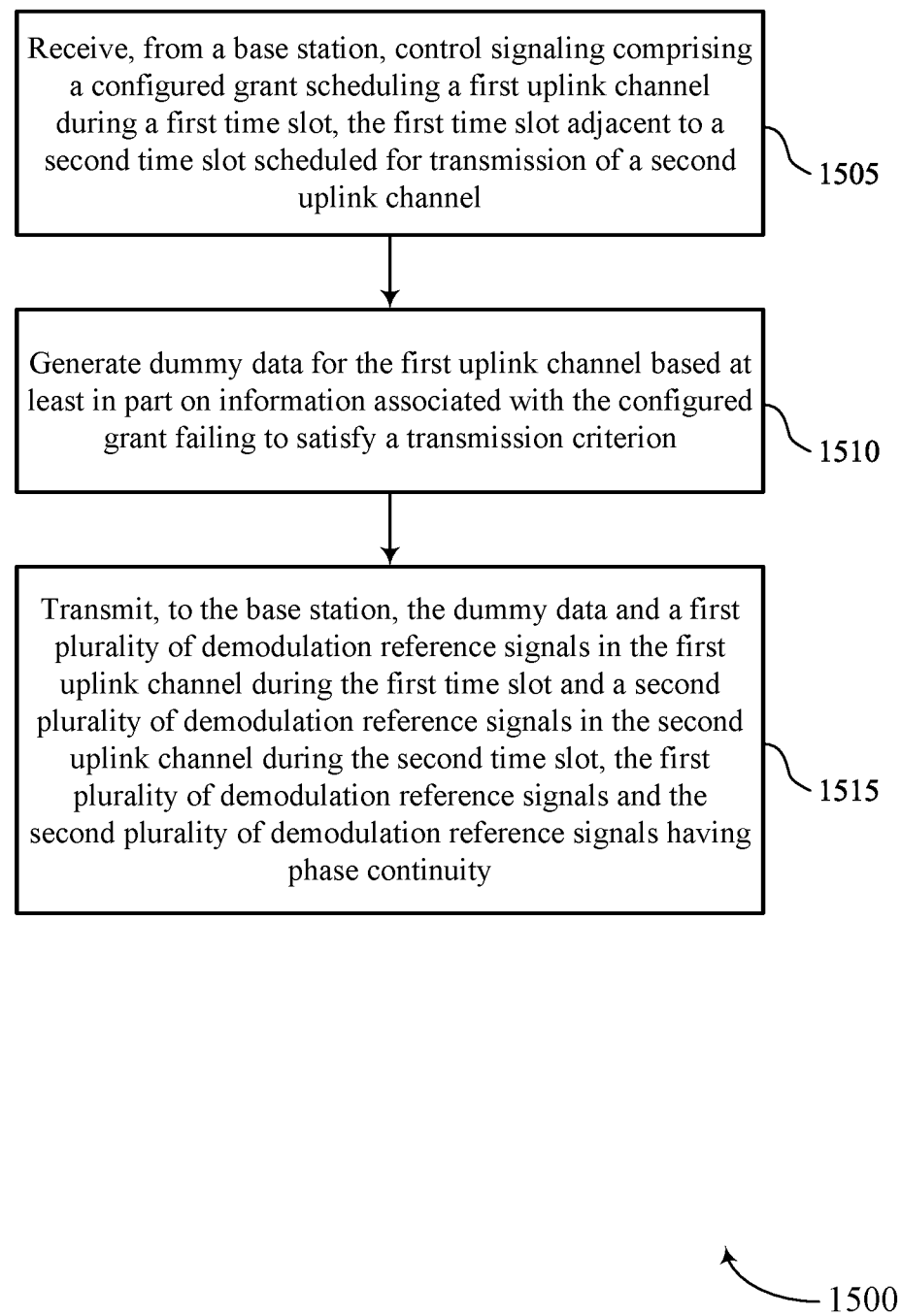
FIGS. 15 through 18 show flowcharts illustrating methods that support techniques for demodulation reference signal bundling for configured uplink channels in accordance with aspects of the present disclosure.

FIG. 15 shows a flowchart illustrating a method 1500 that supports techniques for demodulation reference signal bundling for configured uplink channels in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1505, the method may include receiving, from a base station, control signaling including a configured grant scheduling a first uplink channel during a first time slot, the first time slot different from a second time slot scheduled for transmission of a second uplink channel. The operations of 1505 may be performed in accordance with examples as disclosed herein. In some examples, aspects of the operations of 1505 may be performed by a configured grant manager 925 as described with reference to FIG. 9.

At 1510, the method may include generating dummy data for the first uplink channel based on information associated with the configured grant failing to satisfy a transmission criterion. The operations of 1510 may be performed in accordance with examples as disclosed herein. In some examples, aspects of the operations of 1510 may be performed by a dummy data manager 930 as described with reference to FIG. 9.

At 1515, the method may include transmitting, to the base station, the dummy data and a first set of multiple demodulation reference signals in the first uplink channel during the first time slot and a second set of multiple demodulation reference signals in the second uplink channel during the second time slot, the first set of multiple demodulation reference signals and the second set of multiple demodulation reference signals having phase continuity. The operations of 1515 may be performed in accordance with examples as disclosed herein. In some examples, aspects of the operations of 1515 may be performed by a phase continuity manager 935 as described with reference to FIG. 9.

Figure 16:
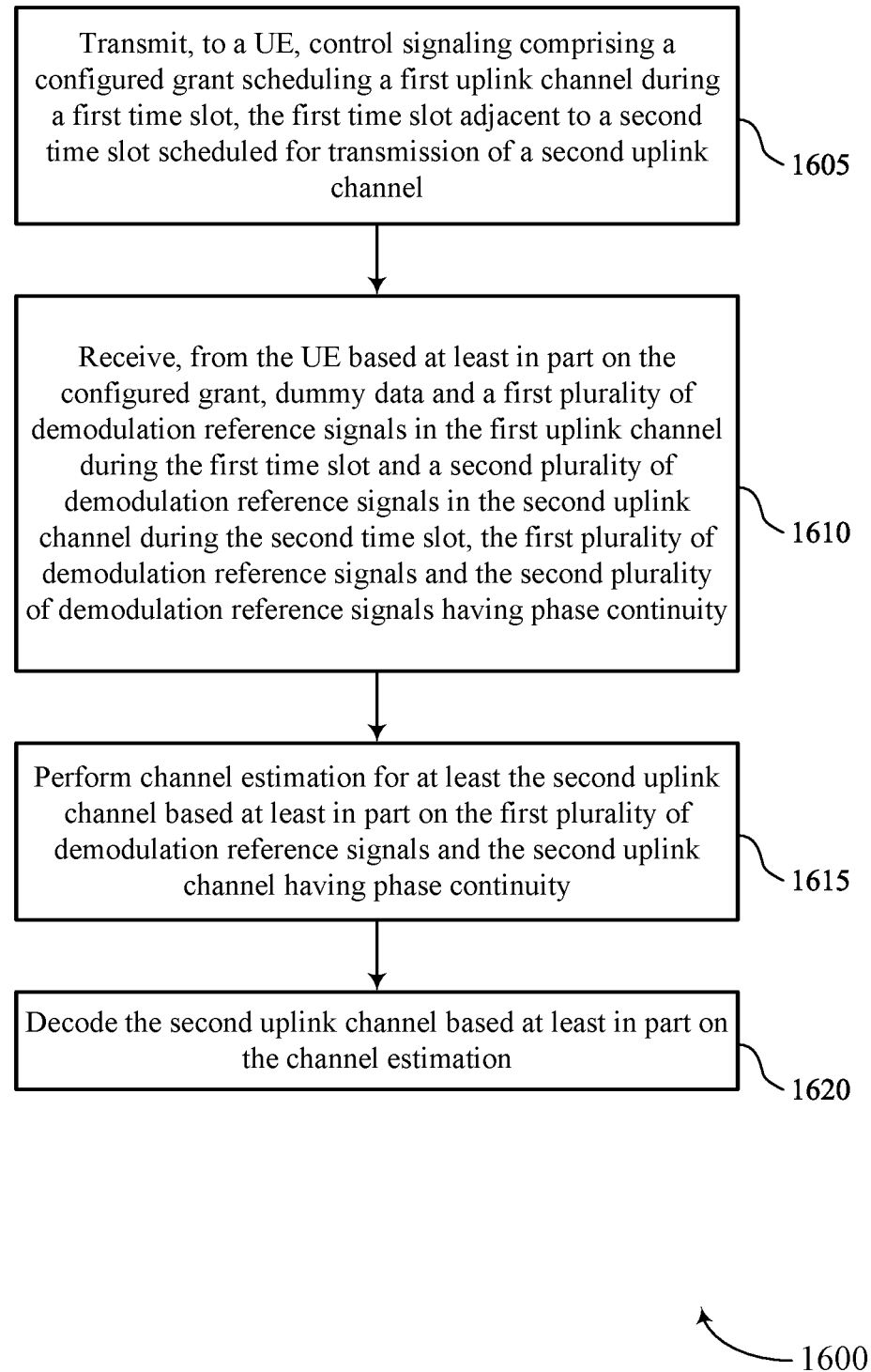

FIG. 16 shows a flowchart illustrating a method 1600 that supports techniques for demodulation reference signal bundling for configured uplink channels in accordance with aspects of the present disclosure. The operations of the method 1600 may be implemented by a base station or its components as described herein. For example, the operations of the method 1600 may be performed by a base station 105 as described with reference to FIGS. 1 through 6 and 11 through 14. In some examples, a base station may execute a set of instructions to control the functional elements of the base station to perform the described functions. Additionally, or alternatively, the base station may perform aspects of the described functions using special-purpose hardware.

At 1605, the method may include transmitting, to a UE, control signaling including a configured grant scheduling a first uplink channel during a first time slot, the first time slot different from a second time slot scheduled for transmission of a second uplink channel. The operations of 1605 may be performed in accordance with examples as disclosed herein. In some examples, aspects of the operations of 1605 may be performed by a configured grant manager 1325 as described with reference to FIG. 13.

At 1610, the method may include receiving, from the UE based on the configured grant, dummy data and a first set of multiple demodulation reference signals in the first uplink channel during the first time slot and a second set of multiple demodulation reference signals in the second uplink channel during the second time slot, the first set of multiple demodulation reference signals and the second set of multiple demodulation reference signals having phase continuity. The operations of 1610 may be performed in accordance with examples as disclosed herein. In some examples, aspects of the operations of 1610 may be performed by a phase continuity manager 1330 as described with reference to FIG. 13.

At 1615, the method may include performing channel estimation for at least the second uplink channel based on the first set of multiple demodulation reference signals and the second uplink channel having phase continuity. The operations of 1615 may be performed in accordance with examples as disclosed herein. In some examples, aspects of the operations of 1615 may be performed by a channel estimation manager 1335 as described with reference to FIG. 13.

At 1620, the method may include decoding the second uplink channel based on the channel estimation. The operations of 1620 may be performed in accordance with examples as disclosed herein. In some examples, aspects of the operations of 1620 may be performed by a decoding manager 1340 as described with reference to FIG. 13.

Figure 17:
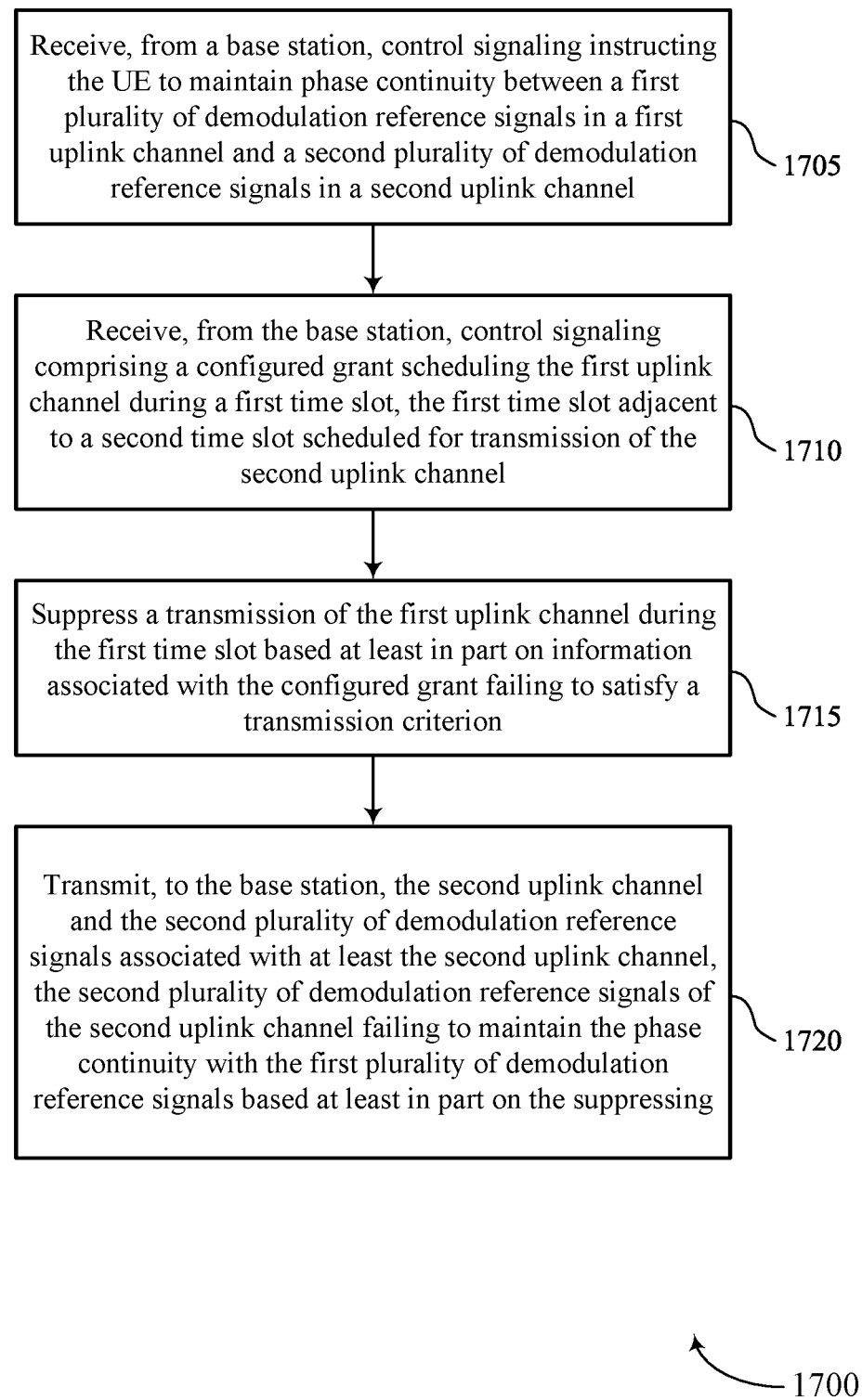

FIG. 17 shows a flowchart illustrating a method 1700 that supports techniques for demodulation reference signal bundling for configured uplink channels in accordance with aspects of the present disclosure. The operations of the method 1700 may be implemented by a UE or its components as described herein. For example, the operations of the method 1700 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1705, the method may include receiving, from a base station, control signaling instructing the UE to maintain phase continuity between a first set of multiple demodulation reference signals in a first uplink channel and a second set of multiple demodulation reference signals in a second uplink channel. The operations of 1705 may be performed in accordance with examples as disclosed herein. In some examples, aspects of the operations of 1705 may be performed by a phase continuity manager 935 as described with reference to FIG. 9.

At 1710, the method may include receiving, from the base station, control signaling including a configured grant scheduling the first uplink channel during a first time slot, the first time slot different from a second time slot scheduled for transmission of the second uplink channel. The operations of 1710 may be performed in accordance with examples as disclosed herein. In some examples, aspects of the operations of 1710 may be performed by a configured grant manager 925 as described with reference to FIG. 9.

At 1715, the method may include suppressing a transmission of the first uplink channel during the first time slot based on information associated with the configured grant failing to satisfy a transmission criterion. The operations of 1715 may be performed in accordance with examples as disclosed herein. In some examples, aspects of the operations of 1715 may be performed by a transmission suppression manager 940 as described with reference to FIG. 9.

At 1720, the method may include transmitting, to the base station, the second uplink channel and the second set of multiple demodulation reference signals associated with at least the second uplink channel, the second set of multiple demodulation reference signals of the second uplink channel failing to maintain the phase continuity with the first set of multiple demodulation reference signals based on the suppressing. The operations of 1720 may be performed in accordance with examples as disclosed herein. In some examples, aspects of the operations of 1720 may be performed by an uplink skipping manager 945 as described with reference to FIG. 9.

Figure 18:
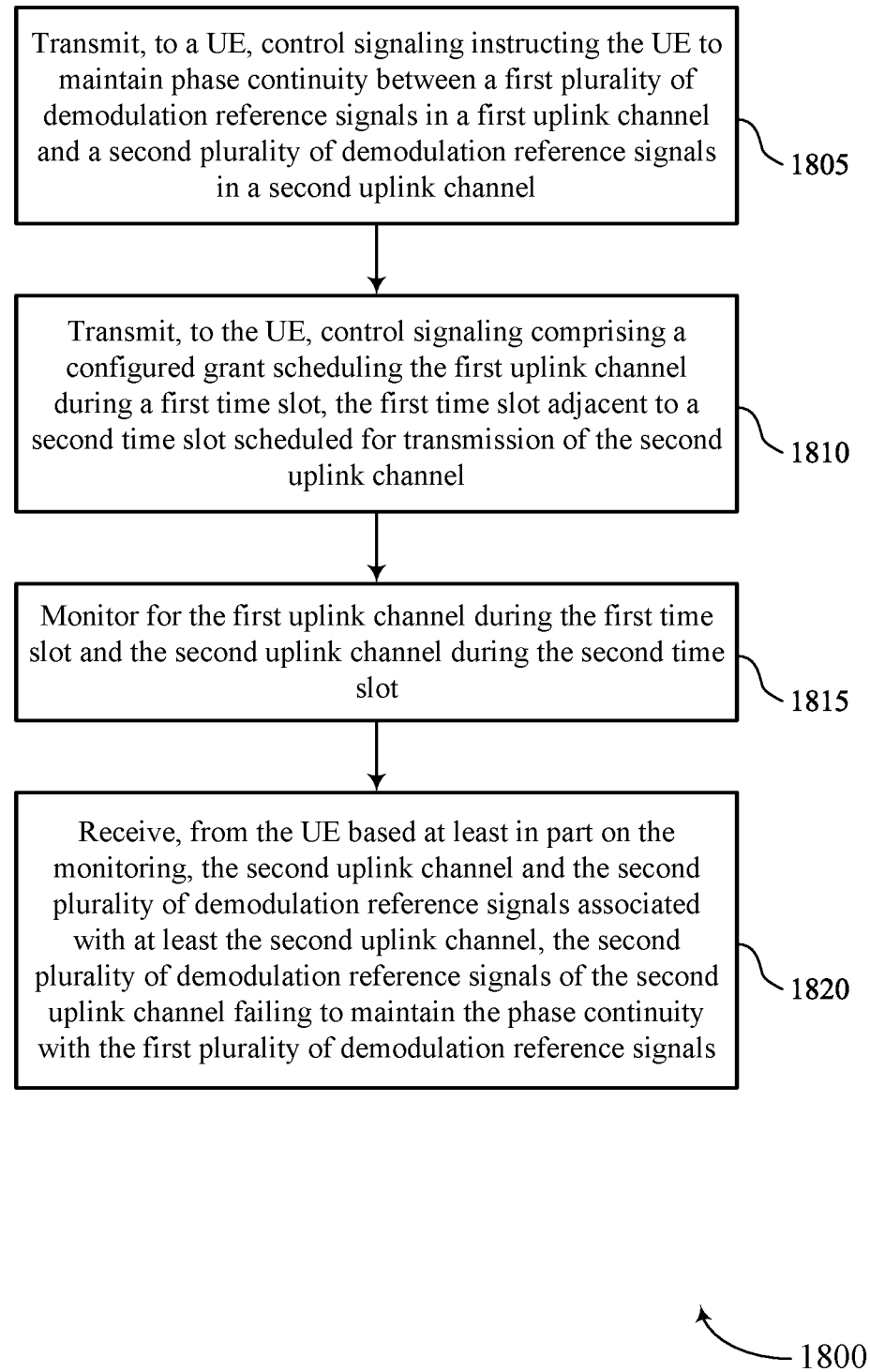

FIG. 18 shows a flowchart illustrating a method 1800 that supports techniques for demodulation reference signal bundling for configured uplink channels in accordance with aspects of the present disclosure. The operations of the method 1800 may be implemented by a base station or its components as described herein. For example, the operations of the method 1800 may be performed by a base station 105 as described with reference to FIGS. 1 through 6 and 11 through 14. In some examples, a base station may execute a set of instructions to control the functional elements of the base station to perform the described functions. Additionally, or alternatively, the base station may perform aspects of the described functions using special-purpose hardware.

At 1805, the method may include transmitting, to a UE, control signaling instructing the UE to maintain phase continuity between a first set of multiple demodulation reference signals in a first uplink channel and a second set of multiple demodulation reference signals in a second uplink channel. The operations of 1805 may be performed in accordance with examples as disclosed herein. In some examples, aspects of the operations of 1805 may be performed by a phase continuity manager 1330 as described with reference to FIG. 13.

At 1810, the method may include transmitting, to the UE, control signaling including a configured grant scheduling the first uplink channel during a first time slot, the first time slot different from a second time slot scheduled for transmission of the second uplink channel. The operations of 1810 may be performed in accordance with examples as disclosed herein. In some examples, aspects of the operations of 1810 may be performed by a configured grant manager 1325 as described with reference to FIG. 13.

At 1815, the method may include monitoring for the first uplink channel during the first time slot and the second uplink channel during the second time slot. The operations of 1815 may be performed in accordance with examples as disclosed herein. In some examples, aspects of the operations of 1815 may be performed by a monitoring manager 1345 as described with reference to FIG. 13.

At 1820, the method may include receiving, from the UE based on the monitoring, the second uplink channel and the second set of multiple demodulation reference signals associated with at least the second uplink channel, the second set of multiple demodulation reference signals of the second uplink channel failing to maintain the phase continuity with the first set of multiple demodulation reference signals. The operations of 1820 may be performed in accordance with examples as disclosed herein. In some examples, aspects of the operations of 1820 may be performed by an uplink skipping manager 1350 as described with reference to FIG. 13.

Aspect 1: A method for wireless communications at a UE, comprising: receiving, from a base station, control signaling comprising a configured grant scheduling a first uplink channel during a first time slot, the first time slot different from a second time slot scheduled for transmission of a second uplink channel; generating dummy data for the first uplink channel based at least in part on information associated with the configured grant failing to satisfy a transmission criterion; and transmitting, to the base station, the dummy data and a first plurality of demodulation reference signals in the first uplink channel during the first time slot and a second plurality of demodulation reference signals in the second uplink channel during the second time slot, the first plurality of demodulation reference signals and the second plurality of demodulation reference signals having phase continuity.

Aspect 2: The method of aspect 1, further comprising: receiving, from the base station, control signaling instructing the UE to maintain the phase continuity across a plurality of uplink channels comprising the first uplink channel and the second uplink channel.

Aspect 3: The method of aspect 2, wherein generating the dummy data for the first uplink channel is based at least in part on receiving the control signaling instructing the UE to maintain the phase continuity across the plurality of uplink channels.

Aspect 4: The method of any of aspects 1 through 3, further comprising: receiving, from the base station, a downlink control information message comprising a dynamic grant scheduling the second uplink channel during the second time slot, wherein transmitting the second plurality of demodulation reference signals in the second uplink channel is based at least in part on receiving the dynamic grant.

Aspect 5: The method of any of aspects 1 through 4, further comprising: receiving, from the base station, control signaling comprising a second configured grant scheduling the second uplink channel during the second time slot, wherein transmitting the second plurality of demodulation reference signals in the second uplink channel is based at least in part on receiving the second configured grant.

Aspect 6: The method of aspect 5, wherein the first configured grant comprises a first instance of a first set of configured grant resources and the second configured grant comprises a second instance of the first set of configured grant resources; or the first configured grant comprises an instance of a first set of configured grant resources and the second configured grant comprises an instance of a second set of configured grant resources.

Aspect 7: The method of any of aspects 1 through 6, further comprising: determining that a quantity of data in a buffer for transmission to the base station fails to satisfy a threshold, wherein the configured grant failing to satisfy the transmission criterion and transmitting the dummy data is based at least in part on the determining.

Aspect 8: The method of any of aspects 1 through 7, wherein one or more of parameters used to maintain the phase continuity comprises a phase value of the first uplink channel and the second uplink channel, a radio frequency band used by the first uplink channel and the second uplink channel, a transmission power of the first uplink channel and the second uplink channel, one or more antenna ports used for transmitting the first plurality of demodulation reference signals and the second plurality of demodulation reference signals, a precoding scheme of the first uplink channel and the second uplink channel, or any combination thereof.

Aspect 9: The method of any of aspects 1 through 8, further comprising: maintaining the phase continuity across the first time slot and the second time slot using a demodulation reference signal bundling procedure that supports joint channel estimation at the base station, wherein the transmitting is based at least in part on maintaining the phase continuity.

Aspect 10: The method of any of aspects 1 through 9, wherein the first uplink channel comprises a physical uplink shared channel; and the second uplink channel comprises a physical uplink shared channel.

Aspect 11: A method for wireless communications at a base station, comprising: transmitting, to a UE, control signaling comprising a configured grant scheduling a first uplink channel during a first time slot, the first time slot different from a second time slot scheduled for transmission of a second uplink channel; receiving, from the UE based at least in part on the configured grant, dummy data and a first plurality of demodulation reference signals in the first uplink channel during the first time slot and a second plurality of demodulation reference signals in the second uplink channel during the second time slot, the first plurality of demodulation reference signals and the second plurality of demodulation reference signals having phase continuity; performing channel estimation for at least the second uplink channel based at least in part on the first plurality of demodulation reference signals and the second uplink channel having phase continuity; and decoding the second uplink channel based at least in part on the channel estimation.

Aspect 12: The apparatus of aspect 11, further comprising: transmitting, to the UE, control signaling instructing the UE to maintain the phase continuity across a plurality of uplink channels comprising the first uplink channel and the second uplink channel.

Aspect 13: The method of aspect 12, wherein receiving the dummy data in the first uplink channel is based at least in part on transmitting the control signaling instructing the UE to maintain the phase continuity across the plurality of uplink channels.

Aspect 14: The apparatus of any of aspects 11 through 13, further comprising: transmitting, to the UE, a downlink control information message comprising a dynamic grant scheduling the second uplink channel during the second time slot, wherein receiving the second plurality of demodulation reference signals in the second uplink channel is based at least in part on transmitting the dynamic grant.

Aspect 15: The apparatus of any of aspects 11 through 14, wherein the instructions are further executable by the processor to cause the apparatus to transmitting, to the UE, control signaling comprising a second configured grant scheduling the second uplink channel during the second time slot, wherein receiving the second plurality of demodulation reference signals in the second uplink channel is based at least in part on transmitting the second configured grant.

Aspect 16: The method of any of aspects 11 through 15, wherein receiving the dummy data is based at least in part on the configured grant failing to satisfy a transmission criterion for the UE.

Aspect 17: The method of any of aspects 11 through 16, wherein one or more parameters used to receive the first plurality of demodulation reference signals and the second plurality of demodulation reference signals having the phase continuity comprises a phase value of the first uplink channel and the second uplink channel, a radio frequency band used by the first uplink channel and the second uplink channel, a resource block used by the first uplink channel and the second uplink channel, a transmission power of the first uplink channel and the second uplink channel, one or more antenna ports used for receiving the first plurality of demodulation reference signals and the second plurality of demodulation reference signals, a precoding scheme of the first uplink channel and the second uplink channel, or any combination thereof.

Aspect 18: A method for wireless communications a UE, comprising: receiving, from a base station, control signaling instructing the UE to maintain phase continuity between a first plurality of demodulation reference signals in a first uplink channel and a second plurality of demodulation reference signals in a second uplink channel; receiving, from the base station, control signaling comprising a configured grant scheduling the first uplink channel during a first time slot, the first time slot different from a second time slot scheduled for transmission of the second uplink channel; suppressing a transmission of the first uplink channel during the first time slot based at least in part on information associated with the configured grant failing to satisfy a transmission criterion; and transmitting, to the base station, the second uplink channel and the second plurality of demodulation reference signals associated with at least the second uplink channel, the second plurality of demodulation reference signals of the second uplink channel failing to maintain the phase continuity with the first plurality of demodulation reference signals based at least in part on the suppressing.

Aspect 19: The method of aspect 18, further comprising: receiving, from the base station, a downlink control information message comprising a dynamic grant scheduling the second uplink channel during the second time slot, wherein transmitting the second plurality of demodulation reference signals in the second uplink channel is based at least in part on receiving the dynamic grant.

Aspect 20: The method of any of aspects 18 through 19, further comprising: receiving, from the base station, control signaling comprising a second configured grant scheduling the second uplink channel during the second time slot, wherein transmitting the second plurality of demodulation reference signals in the second uplink channel is based at least in part on receiving the configured grant.

Aspect 21: The method of aspect 20, wherein the first configured grant comprises a first instance of a first set of configured grant resources and the second configured grant comprises a second instance of the first set of configured grant resources; or the first configured grant comprises an instance of a first set of configured grant resources and the second configured grant comprises an instance of a second set of configured grant resources.

Aspect 22: The method of any of aspects 18 through 21, further comprising: determining that a quantity of data in a buffer for transmission to the base station failing to satisfy a threshold, wherein the configured grant failing to satisfy the transmission criterion and transmitting the dummy data is based at least in part on the determining.

Aspect 23: The method of any of aspects 18 through 22, further comprising: selecting, based at least in part on the suppressing, a first set of parameters for transmitting the first plurality of demodulation reference signals; and selecting, based at least in part on the suppressing, a second set of parameters for transmitting the second plurality of demodulation reference signals, wherein the second set of parameters are different from the first set of parameters.

Aspect 24: The method of aspect 23, wherein the first set of parameters comprises a phase value of the first uplink channel, a radio frequency band used by the first uplink channel, a transmission power of the first uplink channel, one or more antenna ports used for transmitting the first plurality of demodulation reference signals, a precoding scheme of the first uplink channel, or any combination thereof; and the second set of parameters comprises a phase value of the second uplink channel, a radio frequency band used by the second uplink channel, a transmission power of the second uplink channel, one or more antenna ports used for transmitting the second plurality of demodulation reference signals, a precoding scheme of the second uplink channel, or any combination thereof.

Aspect 25: The method of any of aspects 18 through 24, wherein the first uplink channel comprises a physical uplink shared channel or a physical uplink control channel; and the second uplink channel comprises a physical uplink shared channel or a physical uplink control channel.

Aspect 26: A method for wireless communications at a base station, comprising: transmitting, to a UE, control signaling instructing the UE to maintain phase continuity between a first plurality of demodulation reference signals in a first uplink channel and a second plurality of demodulation reference signals in a second uplink channel; transmitting, to the UE, control signaling comprising a configured grant scheduling the first uplink channel during a first time slot, the first time slot different from a second time slot scheduled for transmission of the second uplink channel; monitor for the first uplink channel during the first time slot and the second uplink channel during the second time slot; and receive, from the UE based at least in part on the monitoring, the second uplink channel and the second plurality of demodulation reference signals associated with at least the second uplink channel, the second plurality of demodulation reference signals of the second uplink channel failing to maintain the phase continuity with the first plurality of demodulation reference signals.

Aspect 27: The method of aspect 26, further comprising: transmitting, to the UE, a downlink control information message comprising a dynamic grant scheduling the second uplink channel during the second time slot, wherein receiving the second plurality of demodulation reference signals in the second uplink channel is based at least in part on transmitting the dynamic grant.

Aspect 28: The method of any of aspects 26 through 27, further comprising: transmitting, to the UE, control signaling comprising a second configured grant scheduling the second uplink channel during the second time slot, wherein receiving the second plurality of demodulation reference signals in the second uplink channel is based at least in part on transmitting the configured grant.

Aspect 29: The method of any of aspects 26 through 28, further comprising: refraining from performing a channel estimation for the first uplink channel and the second uplink channel based at least in part on failing to receive the first uplink channel and the second plurality of demodulation reference signals failing to maintain the phase continuity with the first plurality of demodulation reference signals.

Aspect 30: The method of any of aspects 26 through 29, further comprising: receiving the first plurality of demodulation reference signals according to a first set of parameters based at least in part on the monitoring and the first plurality of demodulation reference signals failing to maintain phase continuity with the first plurality of demodulation reference signals; and receiving the second plurality of demodulation reference signals according to a second set of parameters based at least in part on the monitoring and the second plurality of demodulation reference signals failing to maintain phase continuity with the first plurality of demodulation reference signals.

Aspect 31: An apparatus for wireless communications at a UE, comprising a processor; memory coupled with the processor; and instructions stored in the memory and executable by the processor to cause the apparatus to perform a method of any of aspects 1 through 10.

Aspect 32: An apparatus for wireless communications at a UE, comprising at least one means for performing a method of any of aspects 1 through 10.

Aspect 33: A non-transitory computer-readable medium storing code for wireless communications at a UE, the code comprising instructions executable by a processor to perform a method of any of aspects 1 through 10.

Aspect 34: An apparatus for wireless communications at a base station, comprising a processor; memory coupled with the processor; and instructions stored in the memory and executable by the processor to cause the apparatus to perform a method of any of aspects 11 through 17.

Aspect 35: An apparatus for wireless communications at a base station, comprising at least one means for performing a method of any of aspects 11 through 17.

Aspect 36: A non-transitory computer-readable medium storing code for wireless communications at a base station, the code comprising instructions executable by a processor to perform a method of any of aspects 11 through 17.

Aspect 37: An apparatus for wireless communications a UE, comprising a processor; memory coupled with the processor; and instructions stored in the memory and executable by the processor to cause the apparatus to perform a method of any of aspects 18 through 25.

Aspect 38: An apparatus for wireless communications a UE, comprising at least one means for performing a method of any of aspects 18 through 25.

Aspect 39: A non-transitory computer-readable medium storing code for wireless communications a UE, the code comprising instructions executable by a processor to perform a method of any of aspects 18 through 25.

Aspect 40: An apparatus for wireless communications at a base station, comprising a processor; memory coupled with the processor; and instructions stored in the memory and executable by the processor to cause the apparatus to perform a method of any of aspects 26 through 30.

Aspect 41: An apparatus for wireless communications at a base station, comprising at least one means for performing a method of any of aspects 26 through 30.

Aspect 42: A non-transitory computer-readable medium storing code for wireless communications at a base station, the code comprising instructions executable by a processor to perform a method of any of aspects 26 through 30

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
   a processor;
   memory coupled with the processor; and
   instructions stored in the memory and executable by the processor to cause the apparatus to:
      receive, from a base station, control signaling comprising a configured grant scheduling a first uplink channel during a first time slot, the first time slot different from a second time slot scheduled for transmission of a second uplink channel;
      generate dummy data for the first uplink channel based at least in part on information associated with the configured grant failing to satisfy a transmission criterion; and
      transmit, to the base station, the dummy data and a first plurality of demodulation reference signals in the first uplink channel during the first time slot and a second plurality of demodulation reference signals in the second uplink channel during the second time slot, the first plurality of demodulation reference signals and the second plurality of demodulation reference signals having phase continuity.

2. The apparatus of claim 1, wherein the instructions are further executable by the processor to cause the apparatus to:
   receive, from the base station, control signaling instructing the UE to maintain the phase continuity across a plurality of uplink channels comprising the first uplink channel and the second uplink channel.

3. The apparatus of claim 2, wherein generating the dummy data for the first uplink channel is based at least in part on receiving the control signaling instructing the UE to maintain the phase continuity across the plurality of uplink channels.

4. The apparatus of claim 1, wherein the instructions are further executable by the processor to cause the apparatus to:
   receive, from the base station, a downlink control information message comprising a dynamic grant scheduling the second uplink channel during the second time slot, wherein transmitting the second plurality of demodulation reference signals in the second uplink channel is based at least in part on receiving the dynamic grant.

5. The apparatus of claim 1, wherein the instructions are further executable by the processor to cause the apparatus to:
   receive, from the base station, control signaling comprising a second configured grant scheduling the second uplink channel during the second time slot, wherein transmitting the second plurality of demodulation reference signals in the second uplink channel is based at least in part on receiving the second configured grant.

6. The apparatus of claim 5, wherein:
   the first configured grant comprises a first instance of a first set of configured grant resources and the second configured grant comprises a second instance of the first set of configured grant resources; or
   the first configured grant comprises an instance of a first set of configured grant resources and the second configured grant comprises an instance of a second set of configured grant resources.

7. The apparatus of claim 1, wherein the instructions are further executable by the processor to cause the apparatus to:
   determine that a quantity of data in a buffer for transmission to the base station fails to satisfy a threshold, wherein the configured grant failing to satisfy the transmission criterion and transmitting the dummy data is based at least in part on the determining.

8. The apparatus of claim 1, wherein one or more of parameters used to maintain the phase continuity comprises a phase value of the first uplink channel and the second uplink channel, a radio frequency band used by the first uplink channel and the second uplink channel, a transmission power of the first uplink channel and the second uplink channel, one or more antenna ports used for transmitting the first plurality of demodulation reference signals and the second plurality of demodulation reference signals, a precoding scheme of the first uplink channel and the second uplink channel, or any combination thereof.

9. The apparatus of claim 1, wherein the instructions are further executable by the processor to cause the apparatus to:
   maintain the phase continuity across the first time slot and the second time slot using a demodulation reference signal bundling procedure that supports joint channel estimation at the base station, wherein the transmitting is based at least in part on maintaining the phase continuity.

10. The apparatus of claim 1, wherein:
    the first uplink channel comprises a physical uplink shared channel; and
    the second uplink channel comprises a physical uplink shared channel.

11. An apparatus for wireless communications at a base station, comprising:
    a processor;
    memory coupled with the processor; and
    instructions stored in the memory and executable by the processor to cause the apparatus to:

transmit, to a user equipment (UE), control signaling comprising a configured grant scheduling a first uplink channel during a first time slot, the first time slot different from a second time slot scheduled for transmission of a second uplink channel;
receive, from the UE based at least in part on the configured grant, dummy data and a first plurality of demodulation reference signals in the first uplink channel during the first time slot and a second plurality of demodulation reference signals in the second uplink channel during the second time slot, the first plurality of demodulation reference signals and the second plurality of demodulation reference signals having phase continuity;
perform channel estimation for at least the second uplink channel based at least in part on the first plurality of demodulation reference signals and the second uplink channel having phase continuity; and
decode the second uplink channel based at least in part on the channel estimation.

12. The apparatus of claim 11, wherein the instructions are further executable by the processor to cause the apparatus to:
transmit, to the UE, control signaling instructing the UE to maintain the phase continuity across a plurality of uplink channels comprising the first uplink channel and the second uplink channel.

13. The apparatus of claim 12, wherein receiving the dummy data in the first uplink channel is based at least in part on transmitting the control signaling instructing the UE to maintain the phase continuity across the plurality of uplink channels.

14. The apparatus of claim 11, wherein the instructions are further executable by the processor to cause the apparatus to:
transmit, to the UE, a downlink control information message comprising a dynamic grant scheduling the second uplink channel during the second time slot, wherein receiving the second plurality of demodulation reference signals in the second uplink channel is based at least in part on transmitting the dynamic grant.

15. The apparatus of claim 11, wherein the instructions are further executable by the processor to cause the apparatus to:
transmit, to the UE, control signaling comprising a second configured grant scheduling the second uplink channel during the second time slot, wherein receiving the second plurality of demodulation reference signals in the second uplink channel is based at least in part on transmitting the second configured grant.

16. The apparatus of claim 11, wherein receiving the dummy data is based at least in part on the configured grant failing to satisfy a transmission criterion for the UE.

17. The apparatus of claim 11, wherein one or more parameters used to receive the first plurality of demodulation reference signals and the second plurality of demodulation reference signals having the phase continuity comprises a phase value of the first uplink channel and the second uplink channel, a radio frequency band used by the first uplink channel and the second uplink channel, a resource block used by the first uplink channel and the second uplink channel, a transmission power of the first uplink channel and the second uplink channel, one or more antenna ports used for receiving the first plurality of demodulation reference signals and the second plurality of demodulation reference signals, a precoding scheme of the first uplink channel and the second uplink channel, or any combination thereof.

18. An apparatus for wireless communications a user equipment (UE), comprising:
a processor;
memory coupled with the processor; and
instructions stored in the memory and executable by the processor to cause the apparatus to:
receive, from a base station, control signaling instructing the UE to maintain phase continuity between a first plurality of demodulation reference signals in a first uplink channel and a second plurality of demodulation reference signals in a second uplink channel;
receive, from the base station, control signaling comprising a configured grant scheduling the first uplink channel during a first time slot, the first time slot different from a second time slot scheduled for transmission of the second uplink channel;
suppress a transmission of the first uplink channel during the first time slot based at least in part on information associated with the configured grant failing to satisfy a transmission criterion; and
transmit, to the base station, the second uplink channel and the second plurality of demodulation reference signals associated with at least the second uplink channel, the second plurality of demodulation reference signals of the second uplink channel failing to maintain the phase continuity with the first plurality of demodulation reference signals based at least in part on the suppressing.

19. The apparatus of claim 18, wherein the instructions are further executable by the processor to cause the apparatus to:
receive, from the base station, a downlink control information message comprising a dynamic grant scheduling the second uplink channel during the second time slot, wherein transmitting the second plurality of demodulation reference signals in the second uplink channel is based at least in part on receiving the dynamic grant.

20. The apparatus of claim 18, wherein the instructions are further executable by the processor to cause the apparatus to:
receive, from the base station, control signaling comprising a second configured grant scheduling the second uplink channel during the second time slot, wherein transmitting the second plurality of demodulation reference signals in the second uplink channel is based at least in part on receiving the configured grant.

21. The apparatus of claim 20, wherein:
the first configured grant comprises a first instance of a first set of configured grant resources and the second configured grant comprises a second instance of the first set of configured grant resources; or
the first configured grant comprises an instance of a first set of configured grant resources and the second configured grant comprises an instance of a second set of configured grant resources.

22. The apparatus of claim 18, wherein the instructions are further executable by the processor to cause the apparatus to:
determine that a quantity of data in a buffer for transmission to the base station failing to satisfy a threshold, wherein the configured grant failing to satisfy the transmission criterion and transmitting the dummy data is based at least in part on the determining.

23. The apparatus of claim 18, wherein the instructions are further executable by the processor to cause the apparatus to:

select, based at least in part on the suppressing, a first set of parameters for transmitting the first plurality of demodulation reference signals; and
select, based at least in part on the suppressing, a second set of parameters for transmitting the second plurality of demodulation reference signals, wherein the second set of parameters are different from the first set of parameters.

24. The apparatus of claim 23, wherein:
the first set of parameters comprises a phase value of the first uplink channel, a radio frequency band used by the first uplink channel, a transmission power of the first uplink channel, one or more antenna ports used for transmitting the first plurality of demodulation reference signals, a precoding scheme of the first uplink channel, or any combination thereof; and
the second set of parameters comprises a phase value of the second uplink channel, a radio frequency band used by the second uplink channel, a transmission power of the second uplink channel, one or more antenna ports used for transmitting the second plurality of demodulation reference signals, a precoding scheme of the second uplink channel, or any combination thereof.

25. The apparatus of claim 18, wherein:
the first uplink channel comprises a physical uplink shared channel or a physical uplink control channel; and
the second uplink channel comprises a physical uplink shared channel or a physical uplink control channel.

26. An apparatus for wireless communications at a base station, comprising:
a processor;
memory coupled with the processor; and
instructions stored in the memory and executable by the processor to cause the apparatus to:
transmit, to a user equipment (UE), control signaling instructing the UE to maintain phase continuity between a first plurality of demodulation reference signals in a first uplink channel and a second plurality of demodulation reference signals in a second uplink channel;
transmit, to the UE, control signaling comprising a configured grant scheduling the first uplink channel during a first time slot, the first time slot different from a second time slot scheduled for transmission of the second uplink channel;
monitor for the first uplink channel during the first time slot and the second uplink channel during the second time slot; and
receive, from the UE based at least in part on the monitoring, the second uplink channel and the second plurality of demodulation reference signals associated with at least the second uplink channel, the second plurality of demodulation reference signals of the second uplink channel failing to maintain the phase continuity with the first plurality of demodulation reference signals.

27. The apparatus of claim 26, wherein the instructions are further executable by the processor to cause the apparatus to:
transmit, to the UE, a downlink control information message comprising a dynamic grant scheduling the second uplink channel during the second time slot, wherein receiving the second plurality of demodulation reference signals in the second uplink channel is based at least in part on transmitting the dynamic grant.

28. The apparatus of claim 26, wherein the instructions are further executable by the processor to cause the apparatus to:
transmit, to the UE, control signaling comprising a second configured grant scheduling the second uplink channel during the second time slot, wherein receiving the second plurality of demodulation reference signals in the second uplink channel is based at least in part on transmitting the configured grant.

29. The apparatus of claim 26, wherein the instructions are further executable by the processor to cause the apparatus to:
refrain from performing a channel estimation for the first uplink channel and the second uplink channel based at least in part on failing to receive the first uplink channel and the second plurality of demodulation reference signals failing to maintain the phase continuity with the first plurality of demodulation reference signals.

30. The apparatus of claim 26, wherein the instructions are further executable by the processor to cause the apparatus to:
receive the first plurality of demodulation reference signals according to a first set of parameters based at least in part on the monitoring and the first plurality of demodulation reference signals failing to maintain phase continuity with the first plurality of demodulation reference signals; and
receive the second plurality of demodulation reference signals according to a second set of parameters based at least in part on the monitoring and the second plurality of demodulation reference signals failing to maintain phase continuity with the first plurality of demodulation reference signals.

* * * * *